US010619727B2

United States Patent
Maurer et al.

(10) Patent No.: US 10,619,727 B2
(45) Date of Patent: *Apr. 14, 2020

(54) SHIFTING CONTROL SYSTEM AND METHOD FOR MULTI-SPEED AUTOMATIC TRANSMISSION BASED ON VEHICLE LOCATION

(71) Applicant: Allison Transmission, Inc., Indianapolis, IN (US)

(72) Inventors: Brent Maurer, Carmel, IN (US); Mark A. Rains, Avon, IN (US); Edmond M. Etchason, New Palestine, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/816,787

(22) Filed: Nov. 17, 2017

(65) Prior Publication Data

US 2018/0073630 A1 Mar. 15, 2018

Related U.S. Application Data

(63) Continuation of application No. 15/220,803, filed on Jul. 27, 2016, now Pat. No. 10,281,030.

(51) Int. Cl.
*B60W 10/11* (2012.01)
*F16H 61/02* (2006.01)
(Continued)

(52) U.S. Cl.
CPC ......... *F16H 61/0213* (2013.01); *F16H 59/18* (2013.01); *F16H 59/44* (2013.01);
(Continued)

(58) Field of Classification Search
CPC .......... Y10T 477/6931; Y10T 477/688; B60W 2710/1005; B60W 10/11;
(Continued)

(56) References Cited

U.S. PATENT DOCUMENTS 5,598,335 A  1/1997 You
5,873,802 A  2/1999 Tabata et al.
(Continued)

FOREIGN PATENT DOCUMENTS

WO       2015/014619 A1    2/2015
WO    WO-2017108039 A1 *  6/2017  ............. F16H 59/66

OTHER PUBLICATIONS

Patent Cooperation Treaty Notification, International Search Report, and Written Opinion of the International Searching Authority, PCT/US2017/026758 to Allison Transmission, Inc., received Jul. 25, 2017, 15 pages.
(Continued)

*Primary Examiner* — Roger L Pang
(74) *Attorney, Agent, or Firm* — Faegre Drinker Biddle & Reath LLP

(57) ABSTRACT

Systems and methods for managing shift changes of a multi-speed automatic transmission of a vehicle are provided. The multi-speed automatic transmission being capable of establishing a plurality of forward speed ratios. The vehicle may include a transmission shift selector having at least one operator selectable shift request input to request a shift change of the multi-speed automatic transmission. A control circuit operatively coupled to the multi-speed automatic transmission is provided which shifts the multi-speed automatic transmission from a first forward speed ratio to a second forward speed ratio in response to shift criteria. The shift criteria may be based on a plurality of operational characteristics related to the vehicle.

14 Claims, 11 Drawing Sheets

(51) Int. Cl.

| | | |
|---|---|---|
| *F16H 61/16* | (2006.01) | |
| *F16H 59/18* | (2006.01) | |
| *F16H 59/44* | (2006.01) | |
| *F16H 59/54* | (2006.01) | |
| *F16H 59/66* | (2006.01) | |
| *B60W 30/18* | (2012.01) | |
| *B60W 30/09* | (2012.01) | |
| *B60W 30/08* | (2012.01) | |
| *F16H 59/00* | (2006.01) | |
| *F16H 59/02* | (2006.01) | |

(52) U.S. Cl.
CPC ............. *F16H 59/54* (2013.01); *F16H 59/66* (2013.01); *F16H 61/16* (2013.01); *B60W 10/11* (2013.01); *B60W 30/08* (2013.01); *B60W 30/09* (2013.01); *B60W 30/18018* (2013.01); *B60W 2550/10* (2013.01); *B60W 2550/142* (2013.01); *B60W 2550/30* (2013.01); *B60W 2550/40* (2013.01); *B60W 2710/1005* (2013.01); *B60Y 2400/301* (2013.01); *F16H 59/0204* (2013.01); *F16H 2059/006* (2013.01); *F16H 2059/0243* (2013.01); *F16H 2059/663* (2013.01); *F16H 2059/666* (2013.01); *F16H 2061/0244* (2013.01); *F16H 2061/163* (2013.01); *Y10T 477/647* (2015.01); *Y10T 477/688* (2015.01); *Y10T 477/6931* (2015.01)

(58) Field of Classification Search
CPC ....... B60W 2550/1742; B60W 2550/40; F16H 61/16; F16H 59/44; F16H 59/18; F16H 59/66; F16H 59/0204; F16H 2061/0244; F16H 2061/163; F16H 2061/2059; F16H 2061/006; F16H 2059/663; F16H 2059/666; F16H 2059/0243; F16H 2059/006

See application file for complete search history.

(56) References Cited

U.S. PATENT DOCUMENTS

| | | | |
|---|---|---|---|
| 5,911,771 A | 6/1999 | Reichart et al. | |
| 6,109,126 A | 8/2000 | Cochran et al. | |
| 6,699,155 B2 | 3/2004 | Nagasaka | |
| 7,499,784 B2 | 3/2009 | Kresse | |
| 7,578,767 B2 | 8/2009 | Matsudaira et al. | |
| 8,000,864 B2 | 8/2011 | Rains | |
| 8,068,963 B2* | 11/2011 | Sugiura | F16H 61/0213 477/140 |
| 8,332,108 B2 | 12/2012 | Kresse et al. | |
| 8,700,277 B2* | 4/2014 | Staudinger | F16H 61/0213 477/91 |
| 8,751,121 B2 | 6/2014 | Takeuchi et al. | |
| 8,880,307 B2 | 11/2014 | Iwao et al. | |
| 8,935,068 B2 | 1/2015 | Kresse et al. | |
| 9,031,751 B2 | 5/2015 | Endo et al. | |
| 9,365,201 B2 | 6/2016 | Shattuck et al. | |
| 9,790,910 B2 | 10/2017 | Quinteros | |
| 9,869,386 B2 | 1/2018 | Park et al. | |
| 10,259,323 B2 | 4/2019 | Turner | |
| 10,281,030 B2* | 5/2019 | Maurer | F16H 61/0213 |
| 2002/0042672 A1 | 4/2002 | Shiiba et al. | |
| 2006/0116239 A1 | 6/2006 | Kumazawa et al. | |
| 2008/0182718 A1 | 7/2008 | Ido et al. | |
| 2012/0017871 A1 | 1/2012 | Matsuda | |
| 2013/0166164 A1 | 6/2013 | Moebus | |
| 2014/0309897 A1 | 10/2014 | Ly | |
| 2014/0336890 A1 | 11/2014 | Kresse et al. | |
| 2015/0292615 A1 | 10/2015 | Shattuck et al. | |
| 2016/0025213 A1 | 1/2016 | Etchason | |
| 2016/0040754 A1 | 2/2016 | Schoolcraft | |
| 2016/0047440 A1 | 2/2016 | Long et al. | |
| 2016/0116025 A1 | 4/2016 | Muller et al. | |
| 2016/0116026 A1 | 4/2016 | Muller et al. | |
| 2016/0116027 A1 | 4/2016 | Muller et al. | |
| 2016/0116028 A1 | 4/2016 | Muller et al. | |
| 2016/0116029 A1 | 4/2016 | Muller et al. | |
| 2016/0138680 A1 | 5/2016 | Schoolcraft | |
| 2016/0138681 A1 | 5/2016 | Schoolcraft | |
| 2016/0138682 A1 | 5/2016 | Schoolcraft | |
| 2018/0073631 A1 | 3/2018 | Maurer et al. | |
| 2018/0290643 A1* | 10/2018 | Jeon | B60W 10/11 |
| 2019/0113136 A1 | 4/2019 | Maurer et al. | |

OTHER PUBLICATIONS

Allison Transmission, "FuelSense," Allison Transmission, Inc., Indianapolis, Indiana, 2014, 2 pages.
Eaton® Automated Transmissions, "The AutoShift® 18-Speed." Eaton Vehicle Group, Galesburg, MI, 2015, 2 pages.

* cited by examiner

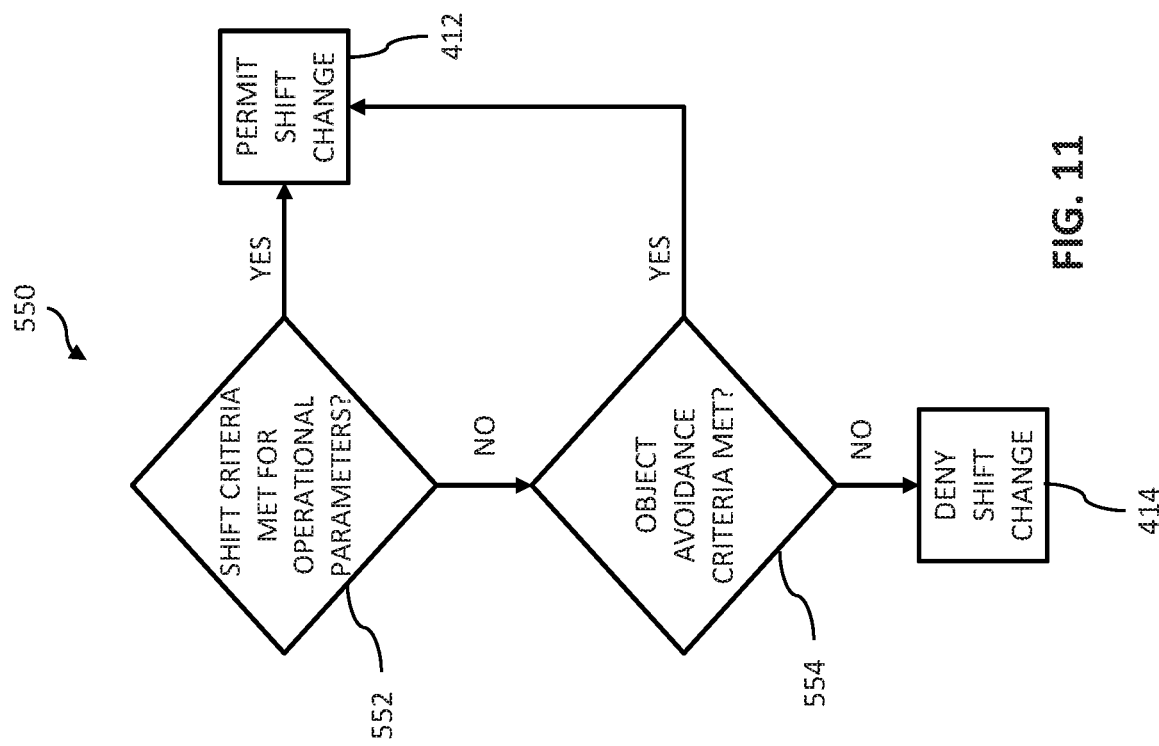

SHIFTING CONTROL SYSTEM AND METHOD FOR MULTI-SPEED AUTOMATIC TRANSMISSION BASED ON VEHICLE LOCATION

RELATED APPLICATIONS

This application is a continuation of U.S. patent application Ser. No. 15/220,803, filed Jul. 27, 2016, titled MANUAL SHIFTING CONTROL SYSTEM AND METHOD FOR MULTI-SPEED AUTOMATIC TRANSMISSION, the entire disclosure of which is expressly incorporated by reference herein.

FIELD OF THE DISCLOSURE

The present disclosure relates to a multi-speed automatic transmission and in particular to a multi-speed automatic transmission having a plurality of forward speed ratios and a control system for limiting manual selection of the plurality of forward speed ratios.

BACKGROUND OF THE DISCLOSURE

Multi-speed automatic transmissions having an operator interface for the selection of a desired forward speed ratio and vehicles incorporating such multi-speed automatic transmissions are known. Such transmissions permit an operator to override a first forward speed ratio selected by a transmission control circuit based on one or more operational characteristics related to the vehicle in favor of a second forward speed ratio. The selection of the second forward speed ratio may be undesired when considering fuel economy for the vehicle, component wear, and other factors.

SUMMARY

The present disclosure provides systems and methods for managing shift changes of a multi-speed automatic transmission of a vehicle. The systems and methods may limit operator selection of the plurality of forward speed ratios.

In some instances throughout this disclosure and in the claims, numeric terminology, such as first, second, third, and fourth, is used in reference to various components, speed ratios, and other items. Such use is not intended to denote an ordering of the components. Rather, numeric terminology is used to assist the reader in identifying the component being referenced and should not be narrowly interpreted as providing a specific order of components.

In an exemplary embodiment of the present disclosure, a system for managing shift changes of a transmission of a vehicle is provided. The system comprising a multi-speed automatic transmission including an input member and an output member operatively coupled to the input member. The multi-speed automatic transmission being configurable in a plurality of forward speed ratios between the input member and the output member. The system further comprising a control circuit operatively coupled to the multi-speed automatic transmission, the control circuit configures the multi-speed automatic transmission to establish each of the plurality of forward speed ratios; an operator interface operatively coupled to the control circuit and including a transmission shift selector having at least one operator selectable shift request input; and a plurality of operational characteristic monitors which monitor a plurality of operational characteristics related to the vehicle. The control circuit configures the multi-speed automatic transmission in a first forward speed ratio of the plurality of forward speed ratios. In response to receiving from the operator interface a request to establish a second forward speed ratio of the plurality of forward speed ratios, the control circuit configures the multi-speed automatic transmission in the second forward speed ratio if the plurality of operational characteristics satisfy a shift criteria logic and the control circuit maintains the multi-speed automatic transmission in the first forward speed ratio if the plurality of operational characteristics fail the shift criteria logic.

In another exemplary embodiment of the present disclosure, a method for managing shift changes of a multi-speed automatic transmission of a vehicle is provided. The method comprising the steps of receiving a request from a multi-speed transmission shift selector of an operator interface located in an operator space of the vehicle to shift the multi-speed automatic transmission from a first forward speed ratio to a second forward speed ratio; monitoring a plurality of operational characteristics of the vehicle; and in response to receiving the request, shifting the multi-speed automatic transmission to the second forward speed ratio when the plurality of operational characteristics satisfy a shift criteria logic and maintaining in the first forward speed ratio when the plurality of operational characteristics fail the shift criteria logic.

In yet another exemplary embodiment of the present disclosure, a system for managing shift changes of a transmission of a vehicle is provided. The system comprising a multi-speed automatic transmission including an input member and an output member operatively coupled to the input member, the multi-speed automatic transmission being configurable in a plurality of forward speed ratios between the input member and the output member; a location determiner which provides an indication of a current location of the vehicle; and a control circuit operatively coupled to the multi-speed automatic transmission and to the location determiner, the control circuit configures the multi-speed automatic transmission to establish each of the plurality of forward speed ratios, the control circuit shifting the multi-speed automatic transmission from a first forward speed ratio to a second forward speed ratio based on the indication of the current location of the vehicle.

In still another exemplary embodiment of the present disclosure, a method for managing shift changes of a multi-speed automatic transmission of a vehicle is provided. The method comprising the steps of receiving a request from a transmission shift selector of an operator interface located in an operator space of the vehicle to shift the multi-speed automatic transmission from a first forward speed ratio to a second forward speed ratio; monitoring a current location of the vehicle; and in response to receiving the request, determining whether to shift the multi-speed automatic transmission to the second forward speed ratio based in part on the current location of the vehicle.

In a further exemplary embodiment of the present disclosure, a system for managing shift changes of a transmission of a vehicle is provided. The system comprising a multi-speed automatic transmission including an input member and an output member operatively coupled to the input member, the multi-speed automatic transmission being configurable in a plurality of forward speed ratios between the input member and the output member; a control circuit operatively coupled to the transmission, the control circuit configures the multi-speed automatic transmission to establish each of the plurality of forward speed ratios; an operator interface operatively coupled to the control circuit and including a transmission shift selector having at least one operator selectable shift request input; and an object detector which monitors an envelope adjacent the vehicle for the presence of an object, wherein the control circuit configures the multi-speed automatic transmission to establish a first forward speed ratio of the plurality of forward speed ratios and in response to receiving from the operator interface a request to establish a second forward speed ratio of the plurality of forward speed ratios, the control circuit configures the multi-speed automatic transmission to establish the second forward speed ratio if an object is detected within the envelope adjacent the vehicle by the object detector.

In yet a further exemplary embodiment of the present disclosure, a method for managing shift changes of a multi-speed automatic transmission of a vehicle is provided. The method comprising the steps of receiving a request from a transmission shift selector of an operator interface located in an operator space of the vehicle to shift the multi-speed automatic transmission from a first forward speed ratio to a second forward speed ratio; monitoring an envelope adjacent the vehicle for an object; and in response to receiving the request, determining whether to shift the multi-speed automatic transmission to the second forward speed ratio based in part on whether the object is within the envelope adjacent the vehicle.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein:

FIG. 11 illustrates yet another exemplary processing sequence for a shift criteria logic of the transmission control circuit of the powered vehicular system of FIG. 1.

Corresponding reference characters indicate corresponding parts throughout the several views. The exemplification set out herein illustrates an exemplary embodiment of the invention and such exemplification is not to be construed as limiting the scope of the invention in any manner.

DETAILED DESCRIPTION

Figure 1:
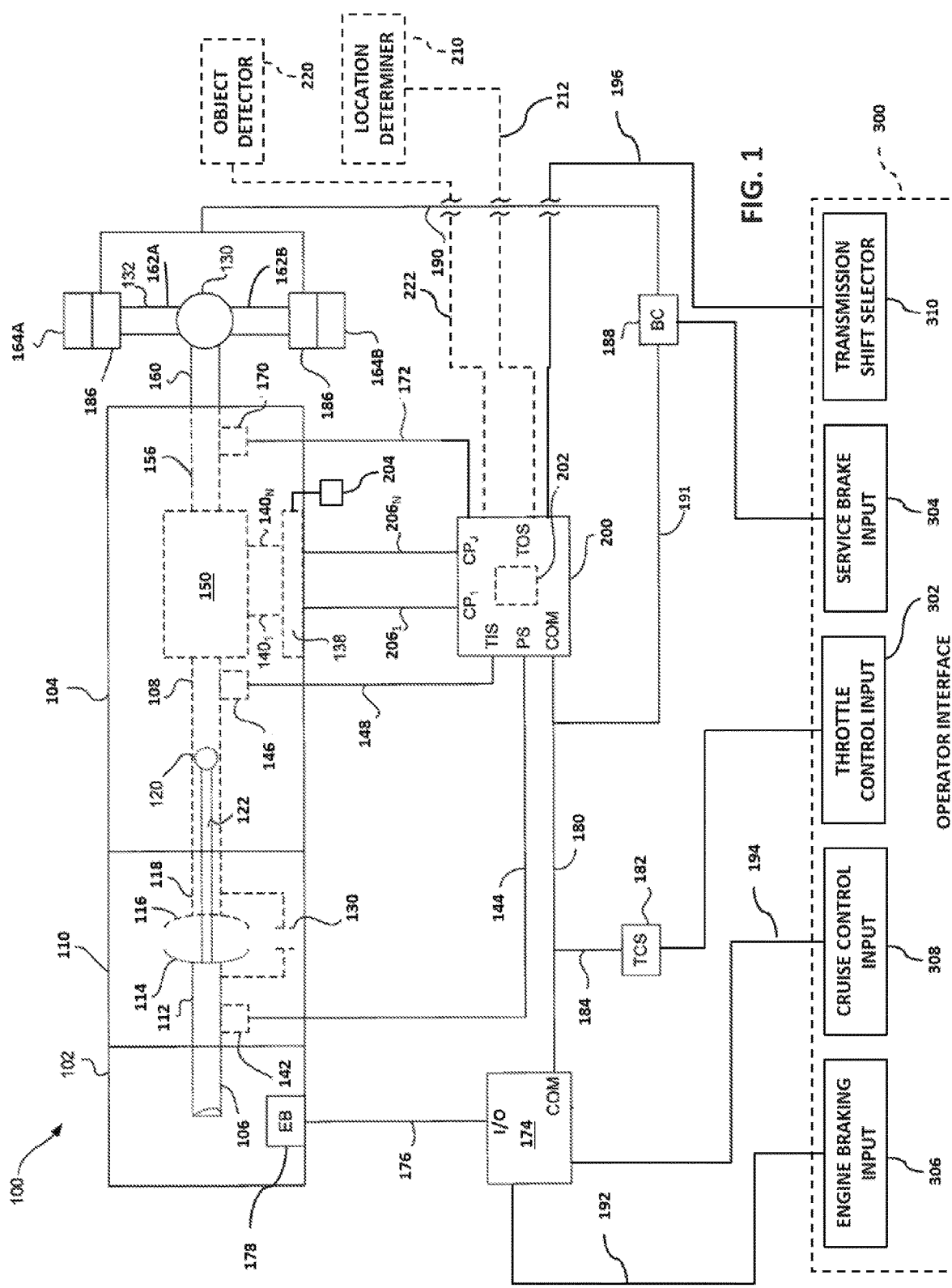
FIG. 1 illustrates a block diagram and schematic view of one illustrative embodiment of a powered vehicular system having a multi-speed automatic transmission.

For the purposes of promoting an understanding of the principles of the present disclosure, reference is now made to the embodiments illustrated in the drawings, which are described below. The embodiments disclosed below are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

Referring now to FIG. 1, an exemplary schematic view of a vehicular system 100 is shown. The vehicular system 100 includes a prime mover 102 operatively coupled to a multi-speed automatic transmission 104. Exemplary prime movers include internal combustion engines, electric motors, hybrid power systems, and other suitable power systems.

Figure 2:
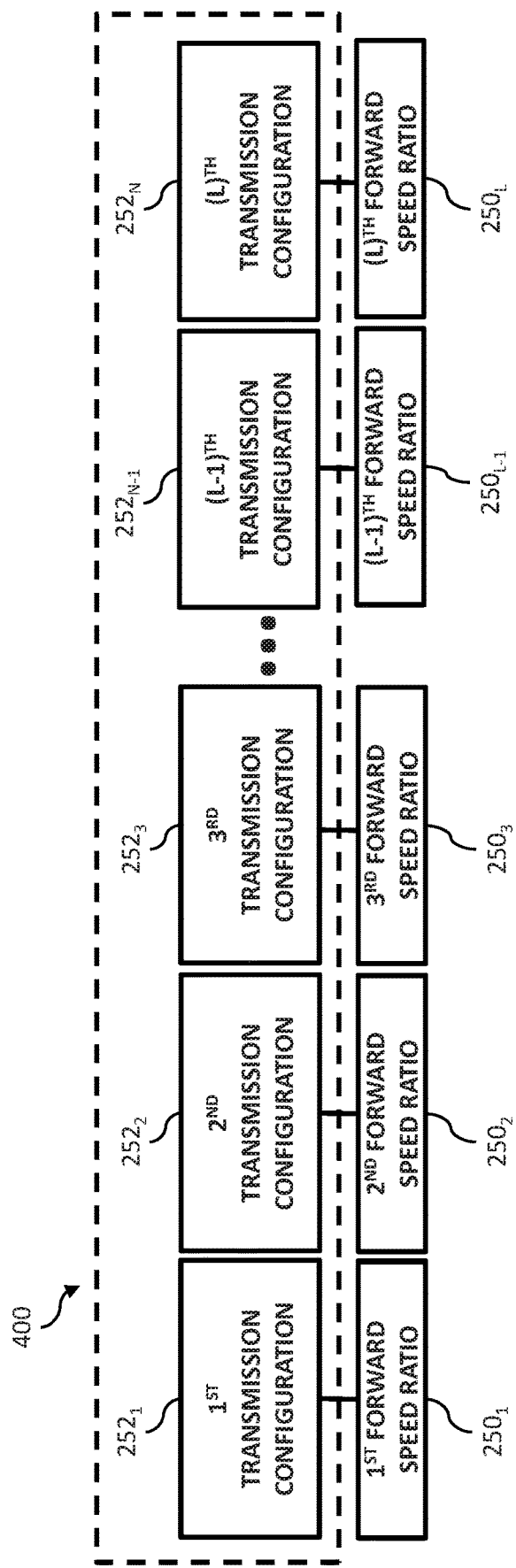
FIG. 2 illustrates a representative view of a plurality of forward speed ratios of the multi-speed automatic transmission of FIG. 1.

As used herein, the term multi-speed automatic transmission is defined as a transmission being configurable in a plurality of forward speed ratios of the output shaft to the input shaft wherein the configuration of the transmission is controlled through a transmission control circuit 200. As explained herein, transmission control circuit 200 includes a shift logic 400 which includes configuration settings $252_1$-$252_L$ (see FIG. 2), wherein L is a positive integer equal to 2 or greater, to configure the components of multi-speed automatic transmission 104 in respective forward speed ratios $250_1$-$250_L$. Multi-speed automatic transmissions may also include one or more reverse speed ratios. Exemplary multi-speed automatic transmissions include automatic transmissions and automated manual transmissions.

One exemplary automatic transmission includes a plurality of planetary gearsets having a plurality of selective couplers which are controlled by transmission control circuit 200 to configure the transmission in the various forward speed ratios. One exemplary automated manual transmission includes at least one gear carried by the input shaft, at least one gear carried by at least one countershaft, at least one gear carried by the output shaft, and a plurality of synchronizers or couplers that couple together various arrangements of the gears and/or shafts to achieve the plurality of forward speed ratios of the output shaft to the input shaft. Exemplary automated manual transmissions include both sliding mesh transmissions and constant mesh transmissions. Exemplary multi-speed automatic transmissions include both transmissions which continuously provide power from the input shaft to the output shaft during shifting and transmissions wherein power from the input shaft to the output shaft is interrupted during shifting.

Prime mover 102 includes an output shaft 106 that is operatively coupled to an input shaft 108 of multi-speed automatic transmission 104. In one embodiment, output shaft 106 of prime mover 102 is coupled to input shaft 108 of multi-speed automatic transmission 104 through a clutch (not shown). In the illustrated embodiment, prime mover 102 indirectly rotates input shaft 108 of multi-speed automatic transmission 104 through a torque converter 110. Output shaft 106 of prime mover 102 rotatably drives an input shaft 112 of torque converter 110. Input shaft 112 is fixedly coupled to an impeller or pump 114. Torque converter 110 further includes a turbine 116 that is coupled to a turbine shaft 118, A coupling fluid is provided in torque converter 110 such that a rotation of pump 114 causes through the fluid a corresponding rotation of turbine 116 and turbine shaft 118. Turbine shaft 118 is coupled to input shaft 108 of multi-speed automatic transmission 104.

In the illustrated embodiment, torque converter 110 includes a lockup clutch 130. Lockup clutch 130 is connected between pump 114 and turbine 116 of torque converter 110. Lockup clutch 130 provides a fixed coupling between pump 114 and turbine 116 when engaged and permits rotation of turbine 116 relative to pump 114 when disengaged. Generally, lockup clutch 130 is disengaged during certain operating conditions such as vehicle launch, low speed, and certain gear shifting conditions. Lockup clutch 130 is generally engaged at higher speeds or for certain gears of multi-speed automatic transmission 104. When engaged, lockup clutch 130 fixedly couples turbine shaft 118 to output shaft 106 of prime mover 102.

Multi-speed automatic transmission 104, in the illustrated embodiment, includes an internal pump 120 for building pressure within different fluid flow circuits (e.g., main circuit, lube circuit, etc.) of multi-speed automatic transmission 104. Pump 120 may be driven by a shaft 122 that is coupled to output shaft 106 of prime mover 102. Thus, prime mover 102 may rotate shaft 122 to drive internal pump 120 and build pressure within the various fluid flow circuits of multi-speed automatic transmission 104. Internal pump 120 may also regulate fluid pressure in torque converter 110.

Figure 3A:
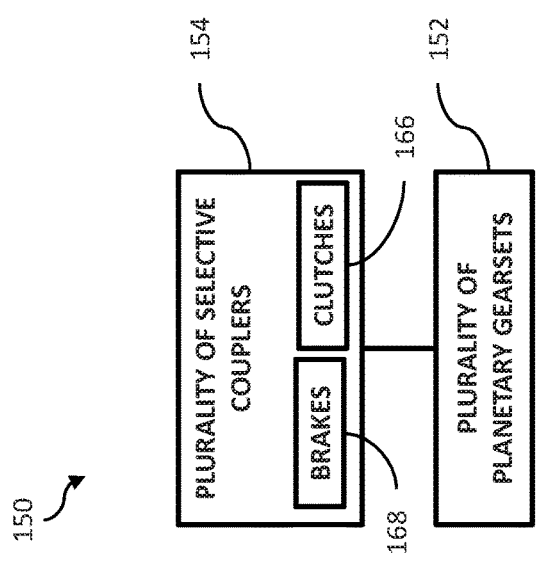
FIG. 3A illustrates a representative view of an exemplary planetary gear transmission of the powered vehicle system of FIG. 1 having a plurality of planetary gearsets and a plurality of selective couplers.

In the illustrated embodiment, multi-speed automatic transmission 104 includes a multi-speed planetary transmission 150. Referring to FIG. 3A, multi-speed planetary transmission 150 includes a plurality of planetary gearsets 152 and a plurality of selective couplers 154 which are operatively coupled to the plurality of planetary gearsets 152. Each planetary gearset includes at least four components: a sun gear; a ring gear; a plurality of planet gears; and a carrier that is rotatably coupled to and carries the planet gears. In the case of a simple planetary gearset, the teeth of the sun gear are intermeshed with the teeth of the planet gears which are in turn engaged with the teeth of the ring gear. Each of these components may also be referred to as a gearset component. Each of the sun gear, the planet carrier, and the ring gear of a respective planetary gearset of the plurality of planetary gearsets 152 may be fixedly coupled to one or more of input shaft 108; an output shaft 156 of multi-speed planetary transmission 150; another one or more of the sun gear, the planet carrier, and the ring gear of one or more of the plurality of planetary gearsets; one or more of the selective couplers; a stationary member of the transmission, such as a housing; and combinations thereof.

It will be apparent to one of skill in the art that some planetary gearsets may include further components than those explicitly identified. For example, one or more of the planetary gearsets may include two sets of planet gears. A first set of planet gears may intermesh with the sun gear while the second set of planet gears intermesh with the first set of planet gears and the ring gear. Both sets of planet gears are carried by the planet carrier. Although multi-speed automatic transmission 104 is illustrated as multi-speed planetary transmission 150 in FIG. 3A, multi-speed automatic transmission 104 may alternatively be structured in other arrangement to provide a plurality of forward speed ratios or gears.

As used herein, a selective coupler 154 is a device which may be actuated to fixedly couple two or more components together. A selective coupler 154 fixedly couples two or more components to rotate together as a unit when the selective coupler is in an engaged configuration. Further, the two or more components may be rotatable relative to each other when the selective coupler is in a disengaged configuration. The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

A first exemplary selective coupler is a clutch 166. A clutch 166 couples two or more rotating components to one another so that the two or more rotating components rotate together as a unit in an engaged configuration and permits relative rotation between the two or more rotating components in the disengaged position. Exemplary clutches may be shiftable friction-locked multi-disk clutches, shiftable form-locking claw or conical clutches, wet clutches, or any other known form of a clutch.

A second exemplary selective coupler is a brake 168. A brake 168 couples one or more rotatable components to a stationary component to hold the one or more rotatable components stationary relative to the stationary component in the engaged configuration and permits rotation of the one or more components relative to the stationary component in the disengaged configuration. Exemplary brakes may be configured as shiftable-friction-locked disk brakes, shiftable friction-locked band brakes, shiftable form-locking claw or conical brakes, or any other known form of a brake.

Selective couplers 154 may be actively controlled devices or passive devices. Exemplary actively controlled devices include hydraulically actuated clutch or brake elements and electrically actuated clutch or brake elements. Returning to FIG. 1, multi-speed automatic transmission 104 further includes an electro-hydraulic system 138 that is fluidly coupled to multi-speed planetary transmission 150 via a number, N, of fluid paths, $140_1$-$140_N$, where N may be any positive integer. In response to control signals $206_1$-$206_N$ from transmission control circuit 200, electro-hydraulic system 138 selectively cause fluid to flow through one or more of the fluid paths, $140_1$-$140_N$, to thereby control the engagement or disengagement of selective couplers 154 of multi-speed planetary transmission 150.

In addition to coupling through selective couplers 154, various ones of the sun gears, the planet carriers, and the ring gears of the planetary gearsets 152 may be fixedly coupled together continuously throughout the operation of the disclosed transmissions. Components may be fixedly coupled together either permanently or removably. Components may be fixedly coupled together through spline connections, press fitting, fasteners, welding, machined or formed functional portions of a unitary piece, or other suitable methods of connecting components.

One or more rotating components, such as shafts, drums, and other components, may be collectively referred to as an interconnector when the one or more components are fixedly coupled together. Interconnectors may further be fixedly coupled to one or more gearset components of planetary gearsets 152 and/or one or more selective couplers 154.

Multi-speed planetary transmission 150 transfers torque from input shaft 108 to output shaft 156. Further, by selectively engaging various combinations of selective couplers 154, multi-speed planetary transmission 150 is able to vary a speed ratio of output shaft 156 relative to input shaft 108 for a plurality of forward gears or speed ratios (input shaft 108 and output shaft 156 both rotating in the same direction) and at least one reverse gear or speed ratio (input shaft 108 and output shaft 156 rotating in opposite directions). The changing or shifting between the various gears of multi-speed planetary transmission 150 is accomplished by selectively controlling the respective engagement and disengagement of selective couplers 154 via control of fluid pressure within the number of fluid paths $140_1$-$140_N$.

Output shaft 156 of multi-speed automatic transmission 104 is coupled to or integral with a drive shaft 160. Output shaft 156 drives a rotation of drive shaft 160. Drive shaft 160 is coupled to a rear drive unit 162, such as a differential. Rear drive unit 162 is coupled to, and rotatably drives, axles 162A and 162B which in turn drive wheels 164A and 164B.

Returning to FIG. 1, vehicular system 100 further includes a transmission control circuit 200. In the illustrated embodiment, transmission control circuit 200 is microprocessor-based and includes a non-transitory computer readable medium 202 which includes processing instructions stored therein that are executable by the microprocessor of transmission control circuit 200 to control operation of torque converter 110 and of multi-speed automatic transmission 104. A non-transitory computer-readable medium, or memory, may include random access memory (RAM), read-only memory (ROM), erasable programmable read-only memory (e.g., EPROM, EEPROM, or Flash memory), or any other tangible medium capable of storing information.

For example, transmission control circuit 200 may execute a shift criteria logic 400 (see FIG. 5) which provides control signals to electro-hydraulic system 138 over control lines $206_1$-$206_N$ to achieve various configurations of multi-speed automatic transmission 104 which results in respective forward speed or gear ratios. In the case of multi-speed planetary transmission 150, shift logic 400 may selectively engage and disengage various ones of selective couplers 154 resulting in multi-speed planetary transmission 150 shifting between various gear or speed ratios of planetary gearsets 152. The term "logic" as used herein includes software and/or firmware executing on one or more programmable processors, application-specific integrated circuits, field-programmable gate arrays, digital signal processors, hard-wired logic, or combinations thereof. Therefore, in accordance with the embodiments, various logic may be implemented in any appropriate fashion and would remain in accordance with the embodiments herein disclosed. A non-transitory machine-readable medium comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein. This disclosure contemplates other embodiments in which transmission control circuit 200 is not microprocessor-based, but rather is configured to control operation of the torque converter 110 and/or multi-speed automatic transmission 104 based on one or more sets of hardwired instructions and/or software instructions stored in the memory unit 144. Further, transmission control circuit 200 may be contained within a single device or be a plurality of devices networked together to provide the functionality described herein.

Transmission control circuit 200 receives multiple inputs that may be used by shift criteria logic 400 to determine whether to shift between various gears of multi-speed automatic transmission 104, such as various gears of planetary gearsets 152 of multi-speed planetary transmission 150 in the illustrated embodiment. Referring to FIG. 1, vehicular system 100 includes a number of sensors associated with one of multi-speed automatic transmission 104 and torque converter 110 and configured to produce indications of one or more operating states of multi-speed automatic transmission 104 and torque converter 110, respectively. The sensors may either actively provide an indication by sending a sensor signal or passively provide an indication by making available a monitored characteristic, such as a voltage, a temperature, a pressure or other suitable characteristics. Sensors are one type of operational characteristic monitoring devices.

For example, torque converter 110 illustratively includes a conventional speed sensor 142 that is positioned to provide an indication of a rotational speed of input shaft which also corresponds to the rotational speed of output shaft 106 of prime mover 102. Speed sensor 142 is electrically connected to a pump speed input, PS, of transmission control circuit 200 via a signal path 144. Transmission control circuit 200 processes the indication of the rotational speed of input shaft 112 in a conventional manner to determine the rotational speed of input shaft 112 of torque converter 110 and hence of output shaft 106 of prime mover 102.

In a similar fashion, multi-speed automatic transmission 104 includes a first conventional speed sensor 146 that is positioned to provide an indication of a rotational speed of input shaft 108 which is the same as a rotational speed of turbine shaft 118 of torque converter 110 and a second conventional speed sensor 170 that is positioned to provide an indication of a rotational speed of output shall 156. Speed sensor 146 is electrically connected to a transmission input shaft speed input, TIS, of transmission control circuit 200 via a signal path 148. Transmission control circuit 200 processes the indication of the rotational speed of input shaft 108 in a conventional manner to determine the rotational speed of input shaft 108 or turbine shaft 118. Speed sensor 170 is electrically connected to a transmission output shaft speed input, TOS, of transmission control circuit 200 via a signal path 172. Transmission control circuit 200 processes the indication of the rotational speed of output shaft 156 in a conventional manner to determine the rotational speed of output shaft 156.

In the illustrated embodiment, vehicular system 100 further includes a prime mover control circuit 174 having an input/output port (I/O) that is electrically coupled to prime mover 102 via a number of signal paths 176, illustratively one. Pd me mover control circuit 174 may be conventional, and is operable to control and manage the overall operation of prime mover 102. Prime mover 102 may include a speed retarding device which reduces the speed of prime mover 102. Exemplary speed retarding devices include an engine brake (EB) 178, an exhaust brake, or other suitable speed-retarding devices. Prime mover control circuit 174 may be electrically and operably coupled to the speed-retarding device (EB) 178 via signal paths 176 to control the speed of prime mover 102.

Prime mover control circuit 174 also includes a communication port, COM, which is electrically connected to a similar communication port, COM, of transmission control circuit 200 via one or more signal paths 180. The one or more signal paths 180 are typically referred to collectively as a data link. Transmission control circuit 200 and prime mover control circuit 174 are operable to exchange information via the one or more signal paths 180 in a conventional manner. In one embodiment, for example, transmission control circuit 200 and prime mover control circuit 174 are operable to exchange information via the one or more signal paths 180 in the form of one or more messages in accordance with a society of automotive engineers (SAE) J-1939 communications protocol, although this disclosure contemplates other embodiments in which transmission control circuit 200 and prime mover control circuit 174 are operable to exchange information via the one or more signal paths 180 in accordance with one or more other conventional communication protocols.

In FIG. 1, vehicular system 100 also includes a throttle control sensor (TCS) 182 which is in electrical communication with a throttle control input 302 which is part of an operator interface 300 positioned in an operator space of the vehicle. As explained in more detail herein, operator interface 300 includes a plurality of operator inputs that may be actuated or otherwise activated by an operator of the vehicle. The operator inputs are an exemplary type of operational characteristic monitoring devices.

Each of the operator inputs of operator interface 300 provide an operator interface input characteristic to one or both of transmission control circuit 200 and prime mover control circuit 174. Throttle control input 302 may be an accelerator pedal actuatable by a foot of the operator and throttle control sensor 182 monitors a position of the accelerator pedal. Throttle control input 302 may be other types of actuatable devices including finger triggers, throttle levers, and other suitable devices that may be actuated. As throttle control input 302 is actuated or triggered, the position of throttle control input 302 may be communicated to or measured by throttle control sensor 182. In turn, throttle control sensor 182 may send a corresponding signal along a signal path 184 through signal paths 180 to one or both of prime mover control circuit 174 and transmission control circuit 200. In one example, transmission control circuit 200 monitors whether throttle control input 302 is actuated or not. In another embodiment, transmission control circuit 200 monitors a percentage amount that throttle control input 302 has been actuated.

Operator interface 300 may include further operator inputs. For example, operator interface 300 includes a service brake input 304. Vehicular system 100 includes a service brake 186 that is operably coupled to axles 162A and 162B to control the speed of wheels 164A, 164B, respectively. Exemplary service brake input 304 includes a brake pedal, a brake lever, or other mechanism accessible by the operator to control the operation of the service brake 186. An operator may actuate or otherwise engage service brake 186 by actuating service brake input 304. In the illustrated embodiment, service brake 186 is controlled by a brake controller (BC) 188 which receives an input from service brake input 304 and controls the operation of service brake 186 through control line 190. In one example, control line 190 is a hydraulic line and brake controller 188 provides sufficient hydraulic pressure to actuate service brake 186 to slow wheels 164A and 164B. Further, brake controller 188 is illustratively shown as being in communication with one or both of transmission control circuit 200 and prime mover control circuit 174 through signal paths 191 and 180. In one example, transmission control circuit 200 monitors whether service brake input 304 is actuated or not.

Operator interface 300 further includes an engine speed retarding input, illustratively an engine braking input 306. Engine braking input 306 is operatively coupled to prime mover control circuit 174 over signal lines 192. Exemplary engine braking inputs include switches, buttons, dials, and other suitable input members. Prime mover control circuit 174 monitors the state of engine braking input 306 (actuated or not) or otherwise receives an indication of the state of engine braking input 306 and sets a configuration of engine brake or other suitable engine retarder 178 accordingly.

Operator interface 300 further includes a cruise control input 308. Cruise control input 308 is operatively coupled to prime mover control circuit 174 over signal lines 194. Exemplary cruise control inputs include switches, buttons, dials, and other suitable input members. Prime mover control circuit 174 monitors the state of cruise control input 308 (actuated or not) or otherwise receives an indication of the state of cruise control input 308 and sets a configuration of prime mover 102 accordingly. In one embodiment, prime mover control circuit 174 configures prime mover 102 to operate to maintain a generally constant ground speed.

Operator interface 300 further includes a transmission shift selector 310. Transmission shift selector 310 is operatively coupled to transmission control circuit 200 over one or more signal lines 196. Transmission shift selector 310 provides the operator with a plurality of inputs through which the operator may communicate a desired gear setting to transmission control circuit 200. For example, an operator may request the multi-speed automatic transmission 104 be placed in a forward gear, a reverse gear, or a neutral configuration. Further, transmission shift selector 310 may provide the operator with inputs to select a desired forward gear or speed ratio. Transmission control circuit 200 monitors the state of transmission shift selector 310 or otherwise receives an indication of the state of transmission shift selector 310 and sets a configuration of multi-speed automatic transmission 104 accordingly.

Figure 4B:
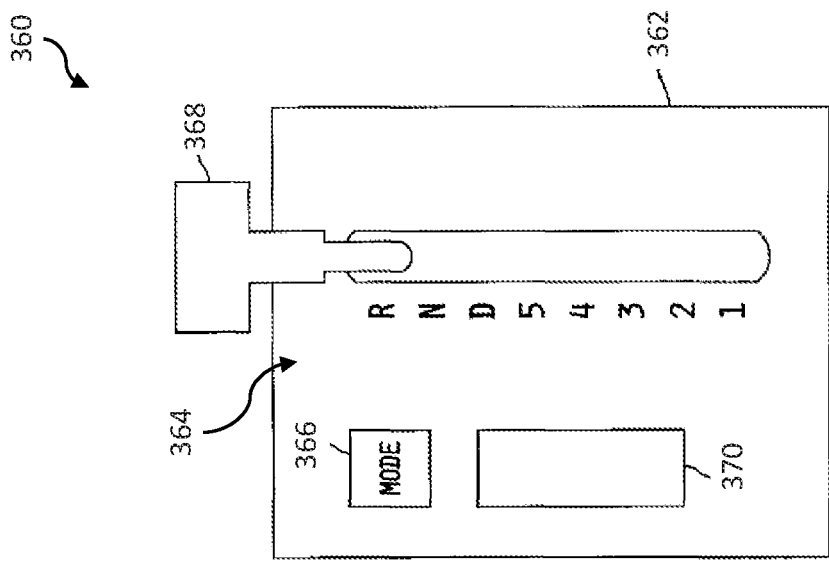
FIG. 4B illustrates a second exemplary transmission shift selector of the powered vehicular system of FIG. 1.
Figure 4A:
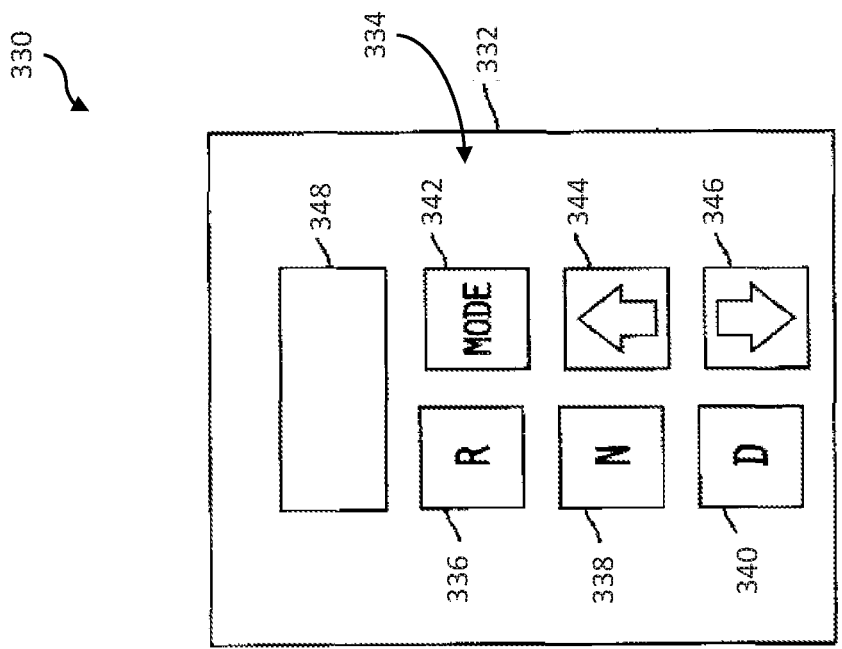
FIG. 4A illustrates a first exemplary transmission shift selector of the powered vehicular system of FIG. 1.

Referring to FIG. 4A, a first transmission operator interface 330 is illustrated. Transmission operator interface 330 includes a housing 332 to which a plurality of operator-selectable input members 334 are mounted. Illustratively, operator-selectable input members 334 includes a plurality of touch-sensitive keys or buttons that are each disposed within a separate well mounted to or integral with housing 330. Alternatively, operator-selectable input members 334 may comprise raised or flush-mounted keys or buttons that are mounted to or integral with transmission operator interface 330. Transmission operator interface 330 further includes an indicator 348 that provides visual feedback to the operator of vehicular system 100 of the status of one or both of vehicular system 100 and multi-speed automatic transmission 104. Exemplary indicators 348 include an LED display, an LCD display, a plurality of indicator lights, or other suitable visual indicators. In one example, indicator 348 provides a visual indication of a vehicle direction of vehicular system 100, a currently selected gear ratio of multi-speed planetary transmission 150, and, if applicable, one or more fault codes.

Operator-selectable input members 334 includes a reverse (R) key or button input 336, a neutral (N) key or button input 338, a forward (D) key or button input 340, a mode (MODE) key or button input 342, a manual shift up (↑) key or button input 344, and a manual shift down (↓) key or button input 346. Transmission control circuit 200 is responsive to user selection of (R) button input 336 to configure multi-speed automatic transmission 104 to operate in a reverse gear. Transmission control circuit 200 is responsive to user selection of (N) button input 338 to configure multi-speed automatic transmission 104 to operate in a neutral state wherein neither a forward or a reverse gear is engaged. Transmission control circuit 200 is responsive to user selection of (D) button input 340 to configure multi-speed automatic transmission 104 to operate in a forward gear.

Figure 3B:
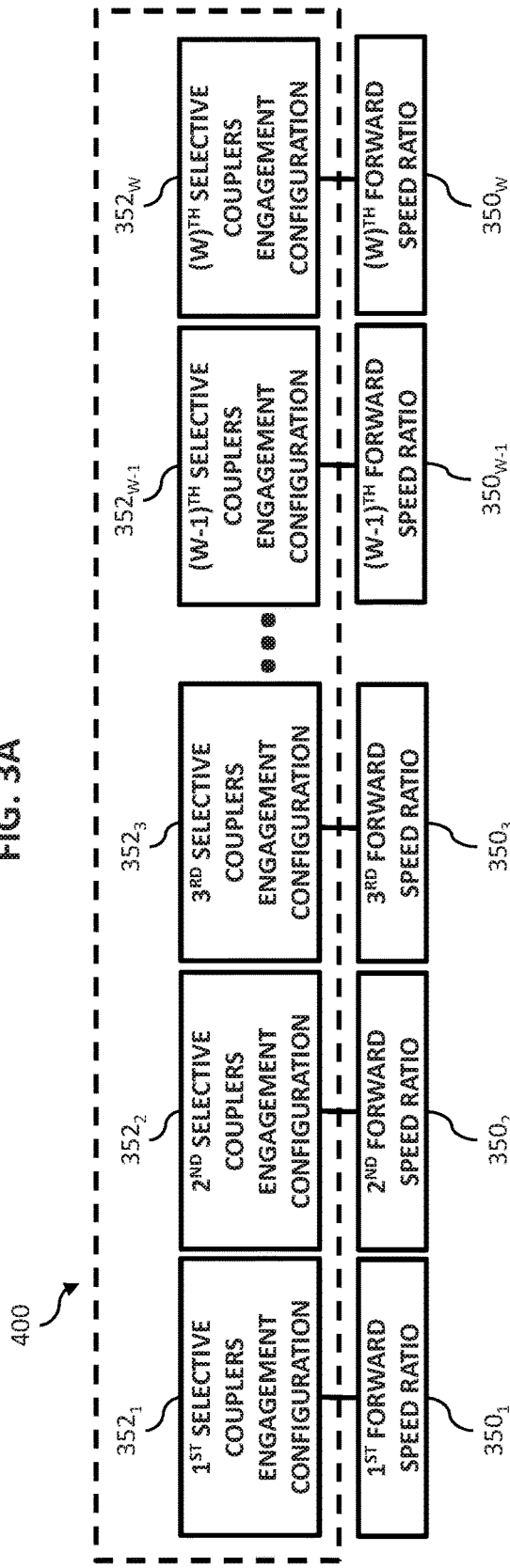
FIG. 3B illustrates a representative view of a plurality of forward speed ratios of the planetary gear transmission of FIG. 3A and the corresponding selective coupler configurations provided in a shift logic of a transmission control circuit of the powered vehicular system of FIG. 1.

Referring to FIG. 3B, shift criteria logic 400 may configure planetary gearsets 152 of multi-speed planetary transmission 150 in a number (W) of forward gears or speed ratios $350_1$-$350_W$, wherein W is a positive integer with a value at least equal to two. In one embodiment, W is equal to or greater than six. In another embodiment, W is equal to or greater than nine. Each of forward gears $350_1$-$350_W$ are established based on respective engagement configurations, $352_1$-$352_W$, of selective couplers 154 of multi-speed planetary transmission 150. Exemplary architectures for multi-speed planetary transmission 150 are disclosed in US Published Patent Application No. 2016/0116025; filed Oct. 21, 2015, titled MULTI-SPEED TRANSMISSION; US Published Patent Application No. 2016/0116026, filed Oct. 22, 2015, titled MULTI-SPEED TRANSMISSION; US Published Patent Application No. 2016/0116027, filed Oct. 22, 2015, titled MULTI-SPEED TRANSMISSION; US Published Patent Application No. 2016/0116028, filed Oct. 22, 2015, titled MULTI-SPEED TRANSMISSION; US Published Patent Application No. 2016/0116029; filed Oct. 22, 2015, titled MULTI-SPEED TRANSMISSION; US Published Patent Application No. 2016/0138680, filed Jan. 21, 2016; titled MULTI-SPEED TRANSMISSION; US Published Patent Application No. 2016/0138681, filed Jan. 21, 2016, titled MULTI-SPEED TRANSMISSION; US Published Patent Application No. 2016/0138682; filed Jan. 21, 2016; titled MULTI-SPEED TRANSMISSION; US Published Patent Application No. 2016/0040754, filed Aug. 7, 2014, titled MULTI-SPEED TRANSMISSION; and US Published Patent Application No. 2016/0047440, filed Aug. 12, 2014, titled MULTI-SPEED TRANSMISSION, the entire disclosures of which are expressly incorporated by reference herein.

Shift criteria logic 400 of transmission control circuit 200 selects which one of forward gears $250_1$-$250_L$ ($350_1$-$350_W$ for multi-speed planetary transmission 150) to be established and when to switch between forward gears $250_1$-$250_L$ ($350_1$-$350_W$ for multi-speed planetary transmission 150) based on various inputs and desired operation of vehicular system 100. For example, shift criteria logic 400 may include control logic that determines to shift between the various forward gears $250_1$-$250_L$ ($350_1$-$350_W$ for multi-speed planetary transmission 150) based on desired performance characteristics for vehicular system 100. Exemplary performance characteristics include increasing fuel economy, decreasing wear on brake components, and other performance characteristics. Exemplary control logics are disclosed in U.S. Pat. No. 8,332,108, filed Jun. 1, 2009, titled SYSTEM FOR DETERMINING A VEHICLE MASS-BASED BREAKPOINT FOR SELECTING BETWEEN TWO DIFFERENT TRANSMISSION SHIFT SCHEDULES; U.S. Pat. No. 8,935,068, filed Jun. 18, 2013, titled SYSTEM AND METHOD FOR OPTIMIZING DOWN-SHIFTING OF A TRANSMISSION DURING VEHICLE DECELERATION; U.S. Pat. No. 9,365,201, filed Mar. 15, 2013, titled DEVICE, SYSTEM, AND METHOD FOR CONTROLLING TRANSMISSION TORQUE TO PROVIDE HILL ASCENT AND/OR DESCENT ASSISTANCE USING ROAD GRADE; US Published Patent Application No. 2015/0292615, filed Apr. 11, 2014, titled SYSTEM AND METHOD FOR AUTOMATIC NEUTRAL AND AUTOMATIC RETURN-TO-RANGE FOR USE WITH AN AUTOMATIC TRANSMISSION; US Published Patent Application No. 2016/0025213, filed Oct. 6, 2015, titled METHOD OF SETTING TRANSMISSION SHIFT POINTS IN REAL-TIME BASED UPON AN ENGINE PERFORMANCE CURVE, the entire disclosures of which are expressly incorporated by reference herein.

Returning to FIG. 4A, transmission control circuit 200 is responsive to user selection of MODE button input 342 to configure multi-speed planetary transmission 150 to select certain operating modes of multi-speed automatic transmission 104. For instance, multi-speed automatic transmission 104 may have a secondary output shaft that is used for power take-off ("PTO") operation. The operator may select to activate the secondary output shaft through MODE button input 342. MODE button input 342 may also be used for other operations, such as clearing fault codes.

As mentioned herein, shift criteria logic 400 automatically selects between forward gears $250_1$-$250_L$ ($350_1$-$350_W$ for multi-speed planetary transmission 150) based on various inputs and further based on various performance characteristics of vehicular system 100. There are instances wherein an operator of vehicular system 100 may desire to elect a different forward gear $250_1$-$250_L$ ($350_1$-$350_W$ for multi-speed planetary transmission 150) than the current forward gear $250_1$-$250_L$ ($350_1$-$350_W$ for multi-speed planetary transmission 150) selected by shift criteria logic 400. As shown in FIG. 4A and mentioned herein, transmission operator interface 330 includes manual shift up (↑) input 344 and manual shift down (↓) input 346. Transmission control circuit 200 is responsive to user selection of manual shift up (↑) input 344 to configure multi-speed automatic transmission 104, illustratively multi-speed planetary transmission 150, to select the next higher forward gear of multi-speed automatic transmission 104 than the one currently established. For instance, if multi-speed automatic transmission 104 is operating in third gear, the selection of manual shift up (↑) input 344 would cause shift criteria logic 400 of transmission control circuit 200 to configure multi-speed automatic transmission 104 to operate in fourth gear, configure selective couplers 154 for the illustrated multi-speed planetary transmission 150. In a similar fashion, transmission control circuit 200 is responsive to user selection of manual shift down (↓) input 346 to configure multi-speed automatic transmission 104 to select the next lower forward gear of multi-speed automatic transmission 104 than the one currently established. For instance, if multi-speed automatic transmission 104 is operating in third gear, the selection of manual shift down (↓) input 346 would cause shift criteria logic 400 of transmission control circuit 200 to configure multi-speed automatic transmission 104 to operate in second gear, configure selective couplers 154 for the illustrated multi-speed planetary transmission 150. As explained herein, shift criteria logic 400 includes additional logic which determines when to permit shifting of gears in response to a selection of either manual shift up (↑) input 344 or manual shift down (↓) input 346 based on additional characteristics of vehicular system 100.

Referring to FIG. 4B, a second exemplary transmission operator interface 360 is illustrated. Transmission operator interface 360 includes a housing 362 to which a plurality of operator-selectable input members 364 is mounted. Illustratively, operator-Selectable input members 364 includes a touch-sensitive mode (MODE) key or button input 366, like mode (MODE) key or button input 342 of transmission operator interface 330, and a shift lever 366. Transmission operator interface 360 further includes an indicator 370, like indicator 348 of transmission operator interface 330, which provides visual feedback to the operator of vehicular system 100 of the status of one or both of vehicular system 100 and multi-speed automatic transmission 104.

Shift lever 368 is manually actuatable to a plurality of different positions. Each of the plurality of different positions corresponds to a different input signal that is provided to the transmission control circuit 200. In the illustrated embodiment, housing 362 includes visual input indicators adjacent to the plurality of different positions of shift lever 368 to provided visual feedback to the operator of a current position of shift lever 368. In the embodiment illustrated in FIG. 4B, shift lever 368 is movable relative to housing 362 to any of the positions R N, 5, 4, 3, 2, and 1. Placing shift lever 368 in the position corresponding to R results in transmission control circuit 200 configuring multi-speed automatic transmission 104 to operate in a reverse gear. Placing shift lever 368 in the position corresponding to N results in transmission control circuit 200 configuring multi-speed automatic transmission 104 to be placed in a neutral state wherein neither a forward nor a reverse gear is engaged. Placing shift lever 368 in the position corresponding to D results in transmission control circuit 200 configuring multi-speed automatic transmission 104 operate in a forward gear. Placing shift lever 368 in one of the positions corresponding to numbers 1-5 results in transmission control circuit 200 configuring multi-speed automatic transmission 104 to operate in the corresponding forward gear. For example, in the illustrated embodiment, placing shift lever 368 in the position corresponding to "1" results in transmission control circuit 200 configuring selective couplers 154 of multi-speed planetary transmission 150 to place multi-speed planetary transmission 150 in first gear.

In one embodiment, shift criteria logic 400 of transmission control circuit 200 determines to permit or deny an operator requested shift change, such as through button input 344 or button input 346 of transmission operator interface 330 or through shift lever 368 of transmission operator interface 360, based on desired performance characteristics for vehicular system 100. Exemplary performance characteristics include increasing fuel economy, decreasing wear on brake components, and other performance characteristics.

Figure 5:
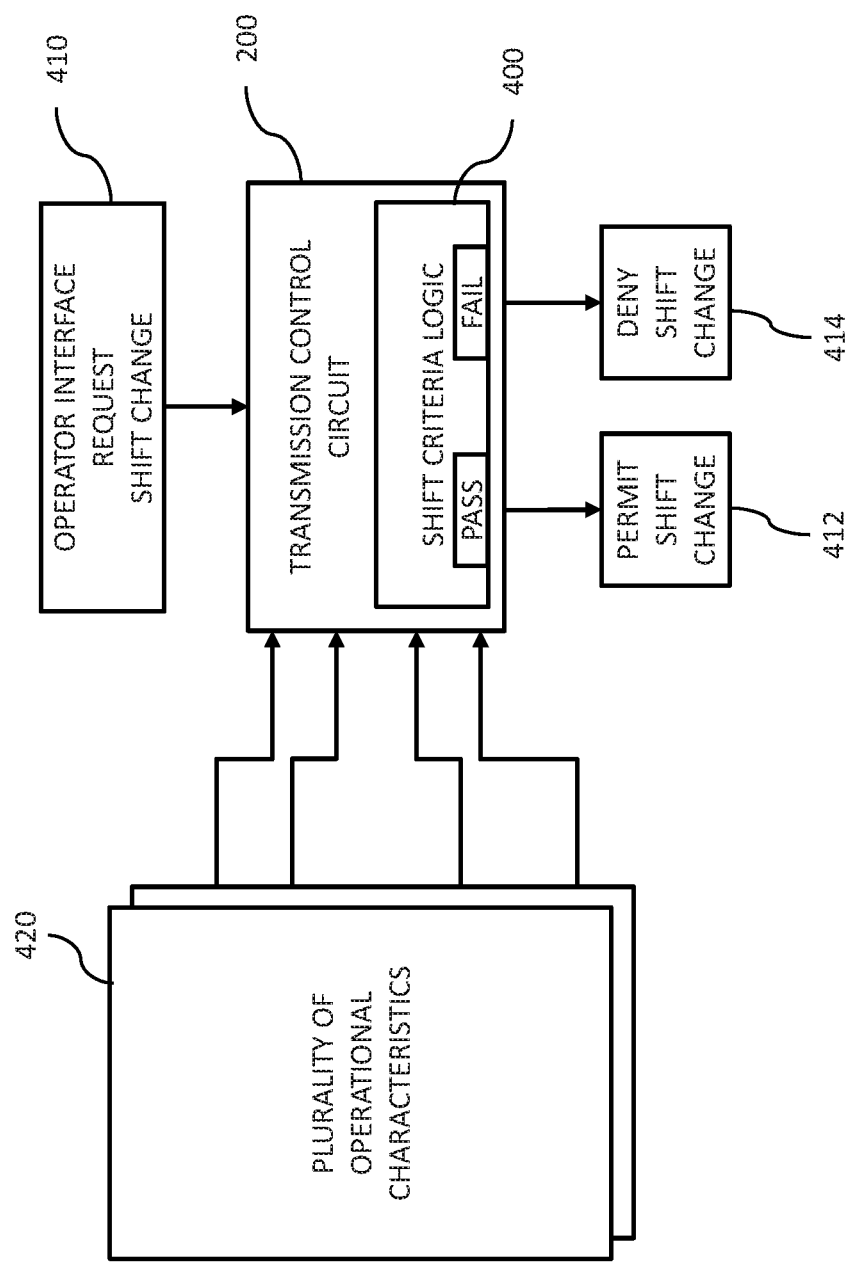
FIG. 5 illustrates a representative view of an operation of the transmission control circuit of the powered vehicular system of FIG. 1 wherein a requested shift change is permitted or denied based on a plurality of operational characteristics.

Referring to FIG. 5, transmission control circuit 200 receives from transmission shift selector 310 an operator interface requested shift change 410. Shift criteria logic 400 determines whether operator interface requested shift change 410 passes a shift criteria based on a plurality of operational characteristics 420. If the shift criteria is passed, transmission control circuit 200 permits the requested shift change to occur, as represented by block 412. For instance, if multi-speed planetary transmission 150 is in $3^{rd}$ gear $350_3$ (see FIG. 3B) and the operator actuates button input 346 of transmission operator interface 330 (see FIG. 4A) to request $2^{nd}$ gear $350_2$, shift criteria logic 400 would alter the configuration of selective couplers 154 of multi-speed planetary transmission 150 to correspond to selective coupler engagement configuration $352_2$ (see FIG. 3B) which places multi-speed planetary transmission 150 in $2^{nd}$ gear $350_2$ (see FIG. 3B). If the shift criteria fails, transmission control circuit 200 denies the requested shift change, as represented by block 414, and multi-speed planetary transmission 150 remains in the current gear selected by shift criteria logic 400.

The plurality of operational characteristics 420 are monitored by a plurality of operational characteristic monitors. By monitoring, an operational characteristic monitor may sense a value indicative of a parameter or determine a parameter based on one or more sensed values and/or determined values.

Exemplary operational characteristics 420 include movement characteristics, vehicle load characteristics, operator interface input characteristics, and other suitable operational characteristics. One or more of movement characteristics, vehicle load characteristics, and operator interface input characteristics may be used by shift criteria logic 400 to determine whether to permit the requested shift change, block 412, or deny the requested shift change, block 414. It is contemplated that any number of the disclosed plurality of operational characteristics 420 may be used, individually or in combination, by shift criteria logic 400 to determine whether to permit the requested shift change, block 412, or deny the requested shift change, block 414. Various examples are provided herein.

Figure 6:
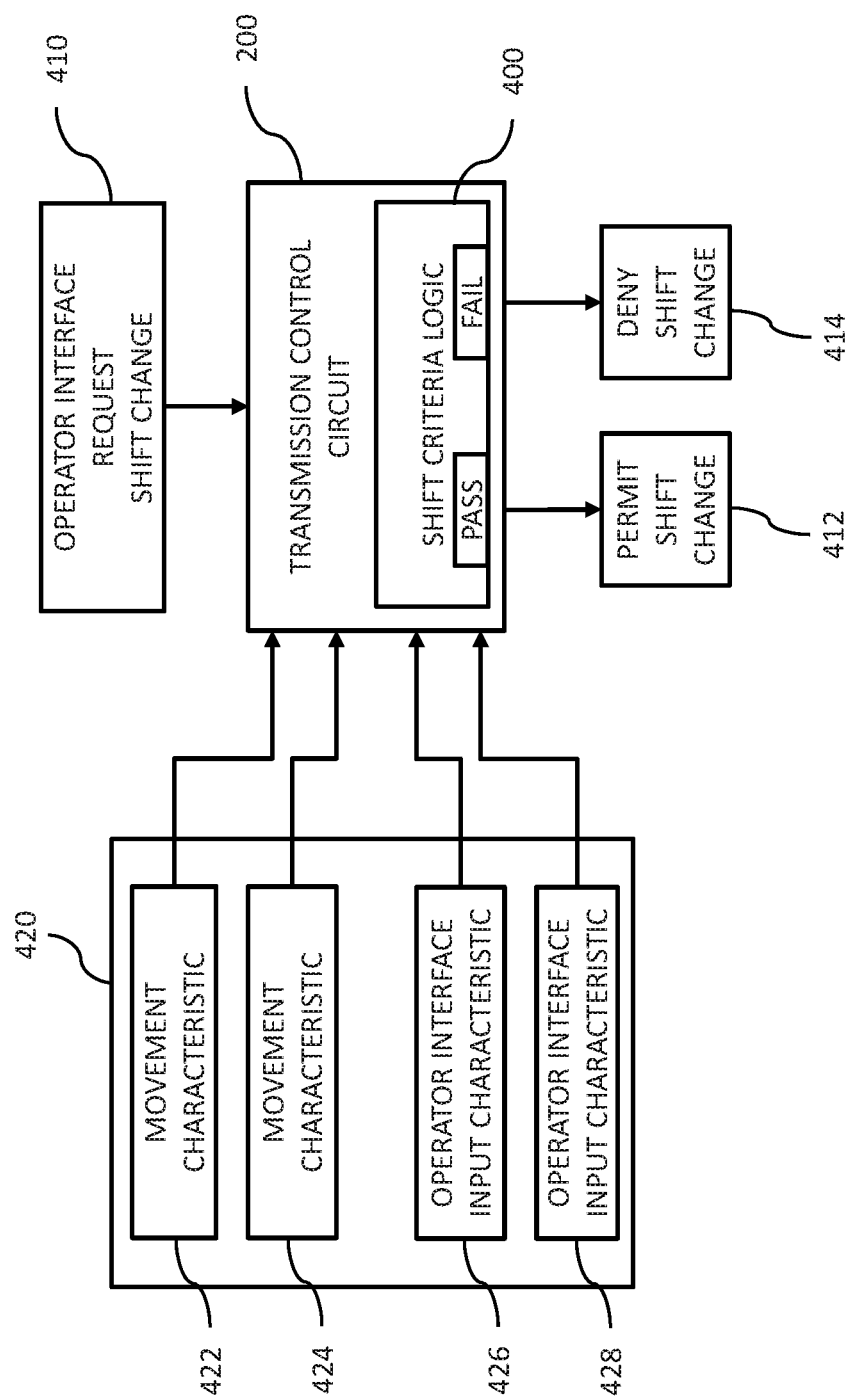
FIG. 6 illustrates a representative view of an operation of the transmission control circuit of the powered vehicular system of FIG. 1 wherein a requested shift change is permitted or denied based on a plurality of operational characteristics including movement characteristics and operator interface input characteristics.

In one embodiment, at least one operational characteristic 420 is selected from at least two of the groups of movement characteristics, vehicle load characteristics, and operator interface input characteristics and used by shift criteria logic 400 to determine whether to permit the requested shift change, block 412, or deny the requested shift change, block 414. One example is shown in FIG. 6 wherein a first movement characteristic 422, a second movement characteristic 424, a first operator interface input characteristic 426, and a second operator interface input characteristic 428 are used by shift criteria logic 400 to determine whether to permit the requested shift change, block 412, or deny the requested shift change, block 414.

Exemplary movement characteristics include road grade, vehicle related speed, engine load, current transmission gear, proximity to surrounding objects, and other suitable characteristics related to the terrain being traversed by vehicular system 100 or the current movement of vehicular system 100.

In one embodiment, a road grade characteristic is monitored by an inclination sensor. An exemplary inclination sensor is an accelerometer 204 supported by vehicular system 100. As illustrated in FIG. 1, accelerometer 204 is supported by electro-hydraulic system 138 of multi-speed automatic transmission 104. Alternatively, the accelerometer may be internally disposed within transmission control circuit 200, internally disposed within prime mover control circuit 174, supported by multi-speed automatic transmission 104, supported by drive unit 102, or another component of vehicular system 100. In any event, accelerometer 204 may continuously measure road grade and communicate the measurement to transmission control circuit 200. Additional details regarding the measurement of road grade are provided in US Published Patent Application No. 2014/0336890, filed Jun. 18, 2013, titled SYSTEM AND METHOD FOR OPTIMIZING DOWNSHIFTING OF A TRANSMISSION DURING VEHICLE DECELERATION, the entire disclosure of which is expressly incorporated by reference herein.

In another embodiment, a road grade characteristic is monitored based on a current location of vehicular system 100. Referring to FIG. 1, in one embodiment, vehicular system 100 includes a location determiner 210 which provides a current location of vehicular system 100, such as longitudinal and latitudinal coordinates. Exemplary location determiners include GPS receivers which, based on signals with orbiting satellites, determine a location of vehicular system 100 and other suitable devices for determining a location of vehicular system 100. Transmission control circuit 200 either has stored a map of road grade values for various locations or includes a communication device, such as a cellular transceiver, that retrieves road grade information from a remote computing device. In one example, location determiner 210 provides an indication of the current location of vehicular system 100 to transmission control circuit 200 through signal line 212. In another example, location determiner 210 provides an indication of the current location of vehicular system 100 through a wireless connection to transmission control circuit 200. In a further example, location determiner 210 provides an indication of the current location of vehicular system 100 to transmission control circuit 200 from prime mover control circuit 174 through signal lines 180.

In one embodiment, a vehicle related speed is monitored by speed sensor 170. Based on a rotational speed of output shaft 156, an estimate of vehicle speed may be determined by transmission control circuit 200. In alternative embodiments, one or more of engine 102 speed (the rotation of output shaft 106 measured by speed sensor 142), turbine 116 speed (the rotation of turbine shaft 118 measured by speed sensor 146), vehicle speed communicated by prime mover control circuit 174, a rotational speed of a countershaft of multi-speed automatic transmission 104, and other suitable devices and methods of determining a speed of vehicular system 100 or a component whose speed is proportional to a speed of vehicular system 100 may be used to monitor a vehicle related speed. In another embodiment, based on spaced apart readings from location determiner 210, transmission control circuit 200 may estimate vehicle speed based on the position values and the time interval. In addition to vehicle speed, vehicle related acceleration or deceleration may be monitored by determining changes in vehicle related speed over time.

In one embodiment, an engine load is monitored by speed sensor 170 or is communicated by prime mover control circuit 174. In one embodiment, the engine load is a measure of the engine torque. In another embodiment, the engine load is a measure of the engine horsepower. The engine load provides an indication of the demand on prime mover 102. In one embodiment, the engine load is estimated based on a rate that fuel is provided to prime mover 102 in the case of an internal combustion engine. A higher fuel rate may indicate acceleration of vehicular system 100 or operation of vehicular system 100 at higher revolutions per minute while a lower fuel rate may indicate deceleration of vehicular system 100 or operation of vehicular system 100 at lower revolutions per minute. The monitoring of engine load may be beneficial for situations wherein throttle control input 302 may not be actuated, but prime mover 102 is not idling. For instance, if cruise control input 308 is actuated, throttle control input 302 is not actuated and prime mover 102 is running at higher than idle to propel vehicular system 100.

In one embodiment, a current transmission gear is monitored by transmission control circuit 200. In the illustrated embodiment, transmission control circuit 200 selects the current gear by controlling the configuration of selective couplers 154 of multi-speed planetary transmission 150. In one example, shift criteria logic 400 may only permit requested shift changes 410 for certain current gears of multi-speed planetary transmission 150. In one example, multi-speed planetary transmission 150 includes at least seven forward gears and transmission control circuit 200 permits a requested shift change only when the current gear of multi-speed planetary transmission 150 is fifth or lower and denies the requested shift change when the current gear is sixth or higher. As mentioned herein, multiple ones of the various plurality of operational characteristics 420 may be combined together to form shift criteria logic 400. For instance, for the example just provided, the current gear setting is one parameter used for determining whether to permit or deny operator interface requested shift change 410 and at least one additional parameter, such as road grade and status of service brake, is used.

In one embodiment, a proximity to surrounding objects characteristic is monitored by an object detector 220 (see FIG. 1) of vehicular system 100. Exemplary object detectors include radar devices, ultrasonic transceivers, cameras, and other suitable devices for monitoring the space adjacent to vehicular system 100. In one example, object detector 220 provides an indication of a detection of an object within a specified envelope of vehicular system 100 or a distance value to a detected object to transmission control circuit 200 through signal line 222. In another example, object detector 220 provides an indication of a detection of an object within a specified envelope of vehicular system 100 or a distance value to a detected object through a wireless connection to transmission control circuit 200. In a further example, object detector 220 provides an indication of a detection of an object within a specified envelope of vehicular system 100 or a distance value to a detected object to transmission control circuit 200 from prime mover control circuit 174 through signal lines 180.

Exemplary operator interface input characteristics include status of engine braking input 306, status of cruise control input 308, status of throttle control input 302, status of service brake input 304, and other suitable status indications of operator controls that are actuatable by an operator of vehicular system 100.

In one embodiment, throttle control input 302 is a foot pedal provided in an operator space of vehicular system 100. As is known, in the case of an internal combustion engine, depressing the foot pedal results in prime mover control circuit 174 providing more fuel to the engine. In one example, throttle control sensor 182 monitors a percentage amount that the foot pedal is depressed and reports the same to transmission control circuit 200. In another example, throttle control sensor 182 simply monitors whether the foot pedal is depressed relative to a non-depressed position and reports the same to transmission control circuit 200.

In one embodiment, service brake input 304 is a foot pedal provided in an operator space of vehicular system 100. As is known, a depression of the foot pedal results in brake controller 188 actuating service brake 186 to slow vehicular system 100. In one example, brake controller 188 monitors a percentage amount that the foot pedal is depressed and reports the same to transmission control circuit 200. In another example, brake controller 188 simply monitors whether the foot pedal is depressed relative to a non-depressed position and reports the same to transmission control circuit 200.

In one embodiment, engine braking input 306 is a button or switch provided on a dash of vehicular system 100. An operator of vehicular system 100 may actuate the button or switch to request engine braking. In one example, the request for engine braking is denied unless throttle control input 302 is greater than zero.

In one embodiment, cruise control input 308 is a button or switch provided on a dash of vehicular system 100 or a steering wheel of vehicular system 100. An operator of vehicular system 100 may actuate the button or switch to request that prime mover control circuit 174 and transmission control circuit 200 maintain a current speed of vehicular system 100 without constant depression of the foot pedal input of throttle control input 302.

Exemplary vehicle load characteristics include vehicle mass, vehicle length, and other suitable characteristics of vehicle load.

In one embodiment a vehicle mass may be determined through load sensors supported by vehicular system 100 to measure a mass or weight of portions of vehicular system 100, such as cargo carrying portions. In another embodiment, vehicle mass is estimated at least based on engine torque and vehicle speed as disclosed in U.S. Pat. No. 7,499,784, filed Apr. 9, 2007, titled METHOD OF SELECTING A TRANSMISSION SHIFT SCHEDULE and U.S. Pat. No. 8,332,108, filed Jun. 1, 2009, titled SYSTEM FOR DETERMINING A VEHICLE MASS-BASED BREAKPOINT FOR SELECTING BETWEEN TWO DIFFERENT TRANSMISSION SHIFT SCHEDULES, the entire disclosures of which are expressly incorporated by reference herein.

In one embodiment, the measured vehicle mass may also provide an indication of vehicle length. For example, transmission control circuit 200 may store an expected baseline mass for vehicular system 100. If the determined vehicle mass is above the baseline, transmission control circuit 200 may infer that a trailer has been attached to vehicular system 100. In an alternative embodiment, vehicular system 100 includes a sensor that detects the coupling of a trailer to vehicular system 100. The presence or absence of a trailer provides an indication of a length of vehicular system 100.

Figure 7:
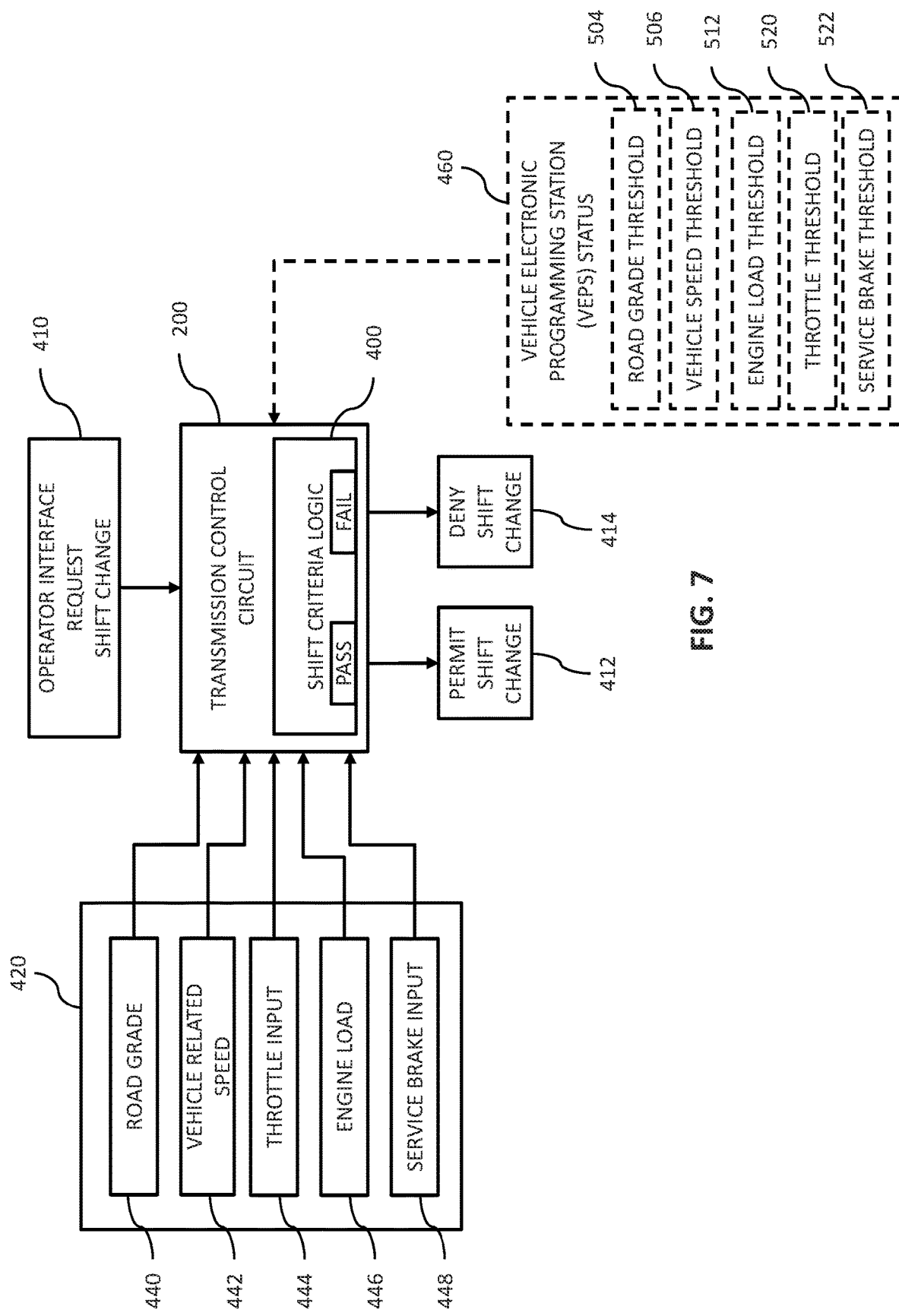
FIG. 7 illustrates a representative view of an operation of the transmission control circuit of the powered vehicular system of FIG. 1 wherein a requested shift change is permitted or denied based on a plurality of operational characteristics including a road grade characteristic, a vehicle related speed characteristic, a throttle input characteristic, an engine load characteristic, and a service brake input characteristic.

Referring to FIG. 7, plurality of operational characteristics 420 includes a road grade characteristic 440, a vehicle related speed characteristic 442, a throttle operator interface input characteristic 444, an engine load characteristic 446, and a service brake operator interface input characteristic 448. Shift criteria logic 400 determines whether to permit the requested shift change 410 or deny the requested shift change based on one or more values of the illustrated characteristics.

Figure 8:
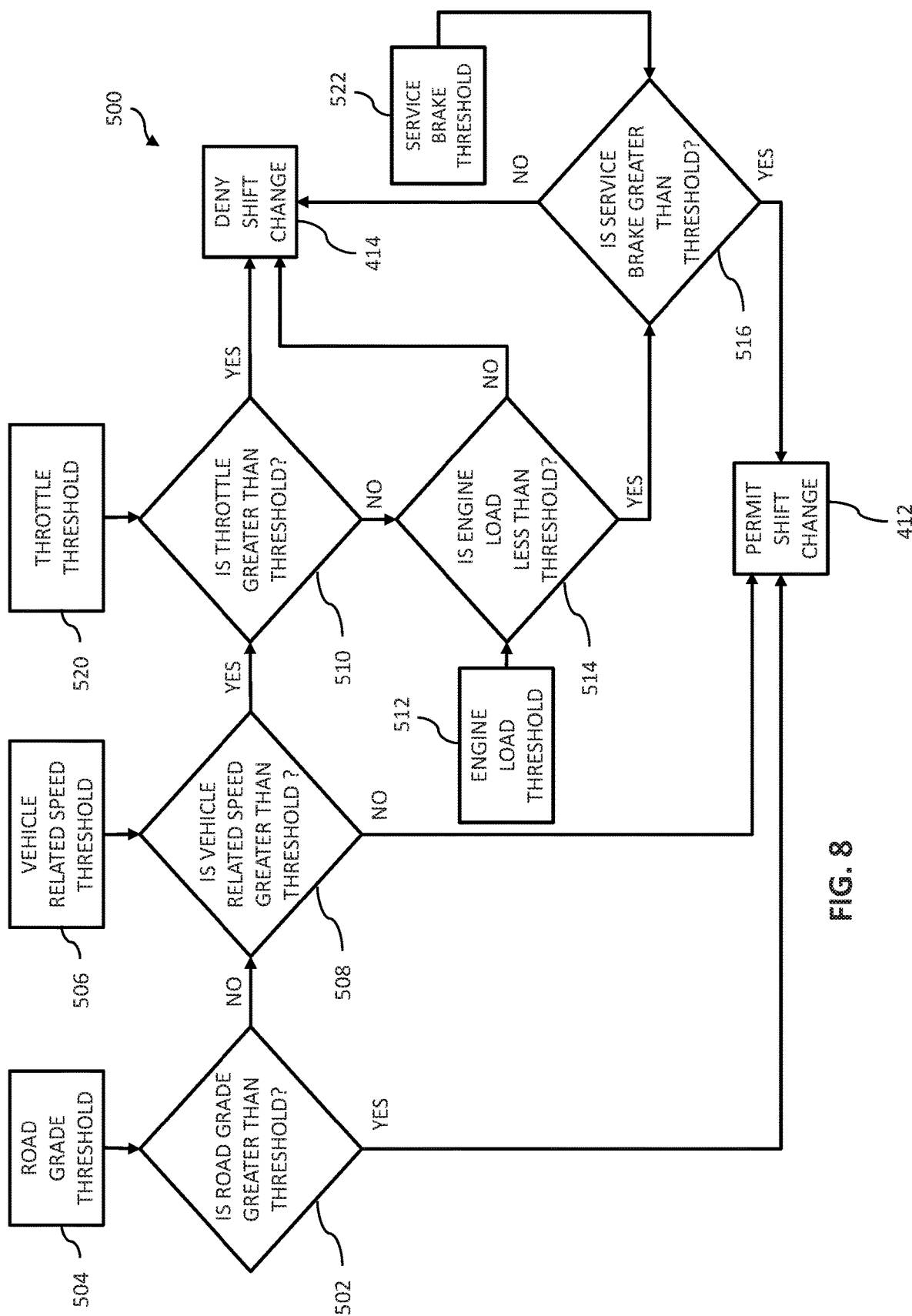
FIG. 8 illustrates an exemplary processing sequence for a shift criteria logic of the transmission control circuit of the powered vehicular system of FIG. 1.

An exemplary processing sequence 500 for shift criteria logic 400 of transmission control circuit 200 is illustrated in FIG. 8. Shift criteria logic 400 determines if road grade characteristic 440 meets a road grade threshold 504, as represented by block 502. In the illustrated example, road grade characteristic 440 meets road grade threshold 504 if road grade characteristic 440 is greater than road grade threshold 504. In another example, road grade characteristic 440 meets road grade threshold 504 if road grade characteristic 440 is less than road grade threshold 504. In the illustrated embodiment, if road grade characteristic 440 is greater than road grade threshold 504, shift criteria logic 400 permits the requested shift change, as represented by block 412.

In the illustrated example, if road grade characteristic 440 is not greater than road grade threshold 504, shift criteria logic 400 determines if the vehicle related speed characteristic 442 meets a vehicle related speed threshold 506, as represented by block 508. In the illustrated example, vehicle related speed characteristic 442 meets vehicle related speed threshold 506 if vehicle related speed characteristic 442 is greater than vehicle related speed threshold 506. In another example, vehicle related speed characteristic 442 meets vehicle related speed threshold 506 if vehicle related speed characteristic 442 is less than vehicle related speed threshold 506. In the illustrated embodiment, if vehicle related speed characteristic 442 is less than vehicle related speed threshold 506, shift criteria logic 400 permits the requested shift change, as represented by block 412.

In the illustrated example, if vehicle related speed characteristic 442 does meet vehicle related speed threshold 506, shift criteria logic 400 determines if the throttle input characteristic 444 meets a throttle threshold 520, as represented by block 510. In the illustrated example, throttle operator interface input characteristic 444 meets throttle threshold 520 if throttle operator interface input characteristic 444 is greater than throttle threshold 520. By setting throttle threshold 520 to zero, any request for throttle will exceed throttle threshold 520. In another example, throttle operator interface input characteristic 444 meets throttle threshold 520 if throttle operator interface input characteristic 444 is less than throttle threshold 520. In the illustrated example, if throttle operator interface input characteristic 444 is greater than throttle threshold 520, shift criteria logic 400 denies the requested shift change, as represented by block 414.

In the illustrated example, if throttle operator interface input characteristic 444 is less than throttle threshold 520, shift criteria logic 400 determines if engine load characteristic 446 meets an engine load threshold 512, as represented by block 514. The engine load is checked along with the throttle to cover situations wherein cruise control input 308 is active and thus the operator is not depressing throttle control input 302. In the illustrated example, engine load characteristic 446 meets engine load threshold 512 if engine load characteristic 446 is less than engine load threshold 512. In another example, engine load characteristic 446 meets engine load threshold 512 if engine load characteristic 446 is greater than engine load threshold 512. In the illustrated example, if engine load characteristic 446 is greater than the engine load threshold 512, shift criteria logic 400 denies the requested shift change, as represented by block 414.

In the illustrated example, if engine load characteristic 446 is less than engine load threshold 512 shift criteria logic 400 determines whether the service brake input characteristic 448 meets a service brake threshold 522. In the illustrated example, service brake operator interface input characteristic 448 meets service brake threshold 522 if service brake operator interface input characteristic 448 is greater than service brake threshold 522. By setting service brake threshold 522 to zero, any application of the service brake will exceed service brake threshold 522. In another example, service brake operator interface input characteristic 448 meets service brake threshold 522 if service brake operator interface input characteristic 448 is less than service brake threshold 522. In the illustrated example, service brake threshold 522 is set to zero and if service brake operator interface input characteristic 448 is greater than service brake threshold 522, shift criteria logic 400 permits the requested shift change, as represented by block 412. If not, shift criteria logic 400 denies the requested shift change, as represented by block 414. Although in the illustrated embodiment shift logic 400 makes shift decisions based on road grade characteristic 440, vehicle related speed characteristic 442, throttle operator interface input characteristic 444, engine load characteristic 446, and service brake operator interface input characteristic 448, in one embodiment, one or more of road grade characteristic 440, vehicle related speed characteristic 442, throttle operator interface input characteristic 444, engine load characteristic 446, and service brake operator interface input characteristic 448 is not included. For example, in one embodiment, service brake operator interface input characteristic 448 is not included and if engine load characteristic 446 meets engine load threshold 512, shift logic 400 permits the shift change, as represented by block 412.

In one embodiment, road grade threshold 504, vehicle related speed threshold 506, engine load threshold 512, throttle threshold 520, and service brake threshold 522 are stored values in non-transitory computer readable medium 202 of transmission control circuit 200 and are not user-definable while in another embodiment road grade threshold 504, vehicle related speed threshold 506, engine load threshold 512, throttle threshold 520, and service brake threshold 522 are stored values in non-transitory computer readable medium 202 of transmission control circuit 200 that are user-definable. One advantage, among others, for permitting the thresholds to be user-definable is that a fleet owner may through the setting of the threshold values have greater control over the manual shifts being performed by the fleet operators.

In one example, road grade threshold 504 is set to about a ±3% grade. Values greater than +3% or less than −3% would be classified by transmission control circuit 200 as above the road grade threshold whiles values at or between −3% and +3% would be classified by transmission control circuit 200 as below the road grade threshold. In another example, road grade threshold 504 is set to about a ±5% grade. Values greater than +5% or less than −5% would be classified by transmission control circuit 200 as above the road grade threshold whiles values at or between −5% and +5% would be classified by transmission control circuit 200 as below the road grade threshold. In one example, vehicle related speed threshold 506 is set to about 25 miles per hour ("mph"). Values at or below about 25 mph would not be classified by transmission control circuit 200 as above the vehicle related speed threshold. In one example, a throttle request of less than about 15% throttle would be classified by transmission control circuit 200 as not a throttle request. In another example, a throttle request of about zero would be classified by transmission control circuit 200 as not a throttle request. In one example, engine load threshold 512 is set to about 30% of maximum engine torque. Values at or below about 30% maximum engine torque would not be classified by transmission control circuit 200 as above the engine load threshold.

Referring to FIG. 7, a Vehicle Electronic Programming Station ("VEPS") 460 is shown in communication with transmission control circuit 200. Transmission control circuit 200 may receive one or more of road grade threshold 504, vehicle related speed threshold 506, engine load threshold 512, throttle threshold 520, and service brake threshold 522 from VEPS 460 for use in processing sequence 500. In this manner, a fleet owner may decide to remove service brake operator interface input characteristic 448 from processing sequence 500 by setting service brake threshold 522 to less than zero. Thus, block 516 will always forward to block 412 because when the service brake is not applied the value of service brake operator interface input characteristic 448 is zero and if applied the value is greater than zero. VEPS 460 may provide additional information to transmission control circuit 200 as well, such as shift schedules and other parameters. Additional details regarding VEPS 460 are provided in U.S. Pat. No. 8,935,068, filed Jun. 18, 2013, titled SYSTEM AND METHOD FOR OPTIMIZING DOWNSHIFTING OF A TRANSMISSION DURING VEHICLE DECELERATION, the entire disclosure of which is expressly incorporated by reference herein.

Although processing sequence 500 is described in connection with permitting or denying requested manual shift changes, it may also be used by transmission control circuit 200 in deciding whether to permit or deny engine brake requests including automatic engine brake requests by transmission control circuit 200.

Figure 9:
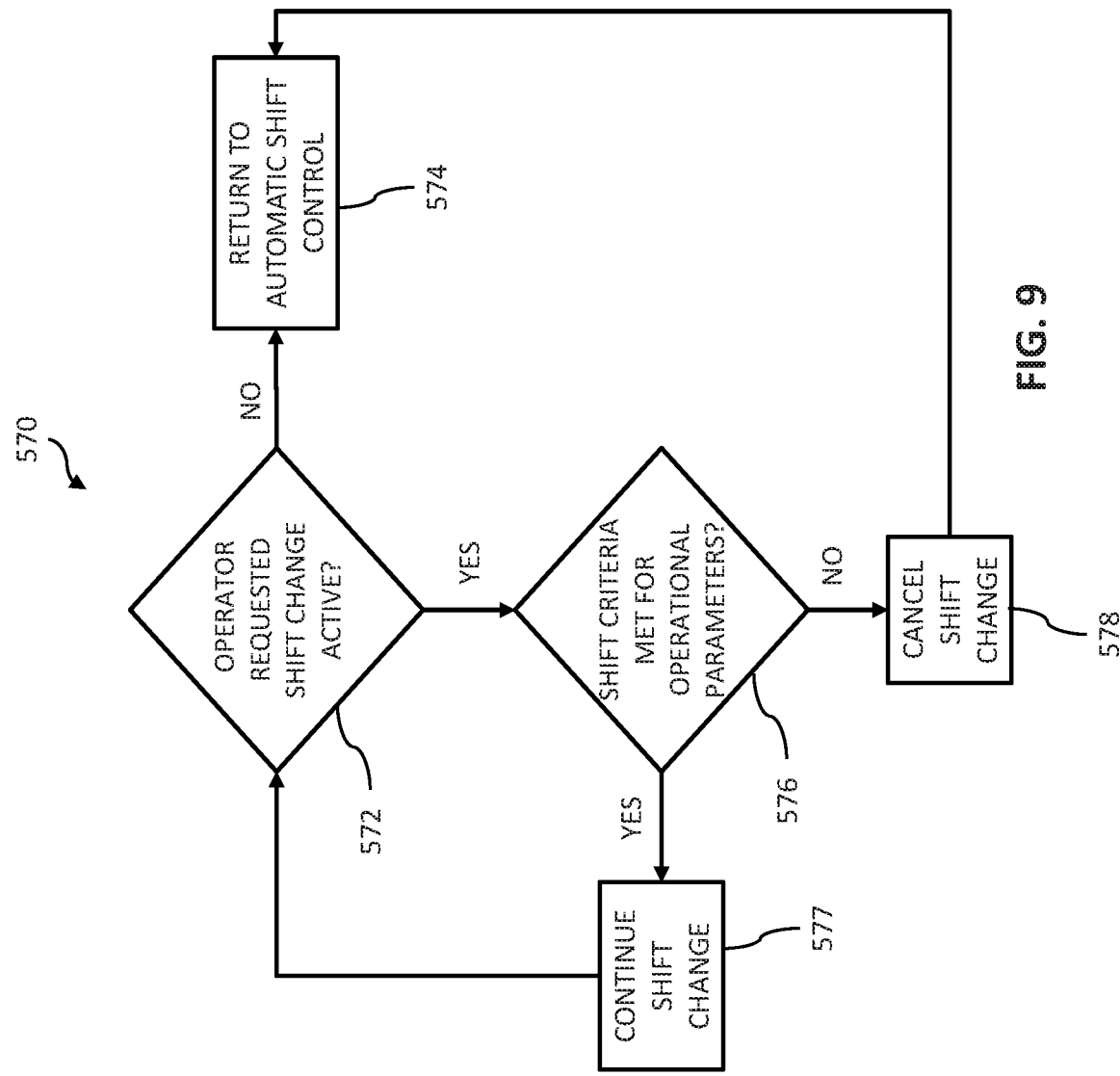
FIG. 9 illustrates another exemplary processing sequence for a shift criteria logic of the transmission control circuit of the powered vehicular system of FIG. 1.

Referring to FIG. 9, in one embodiment, once an operator requested shift change has been permitted (block 412), processing sequence 570 monitors whether the operator requested shift change is still active, as represented by block 572. If not, transmission control circuit 200 returns to its preset automatic shift schedule, as represented by block 574. If the operator requested shift schedule is still active, transmission control circuit 200 determines if the shift criteria for the operational parameters is still met, as represented by block 576. If so, the operator requested shift change remains active, as represented by block 577. In not, the operator requested shift change is cancelled, as represented by block 578.

Figure 10:
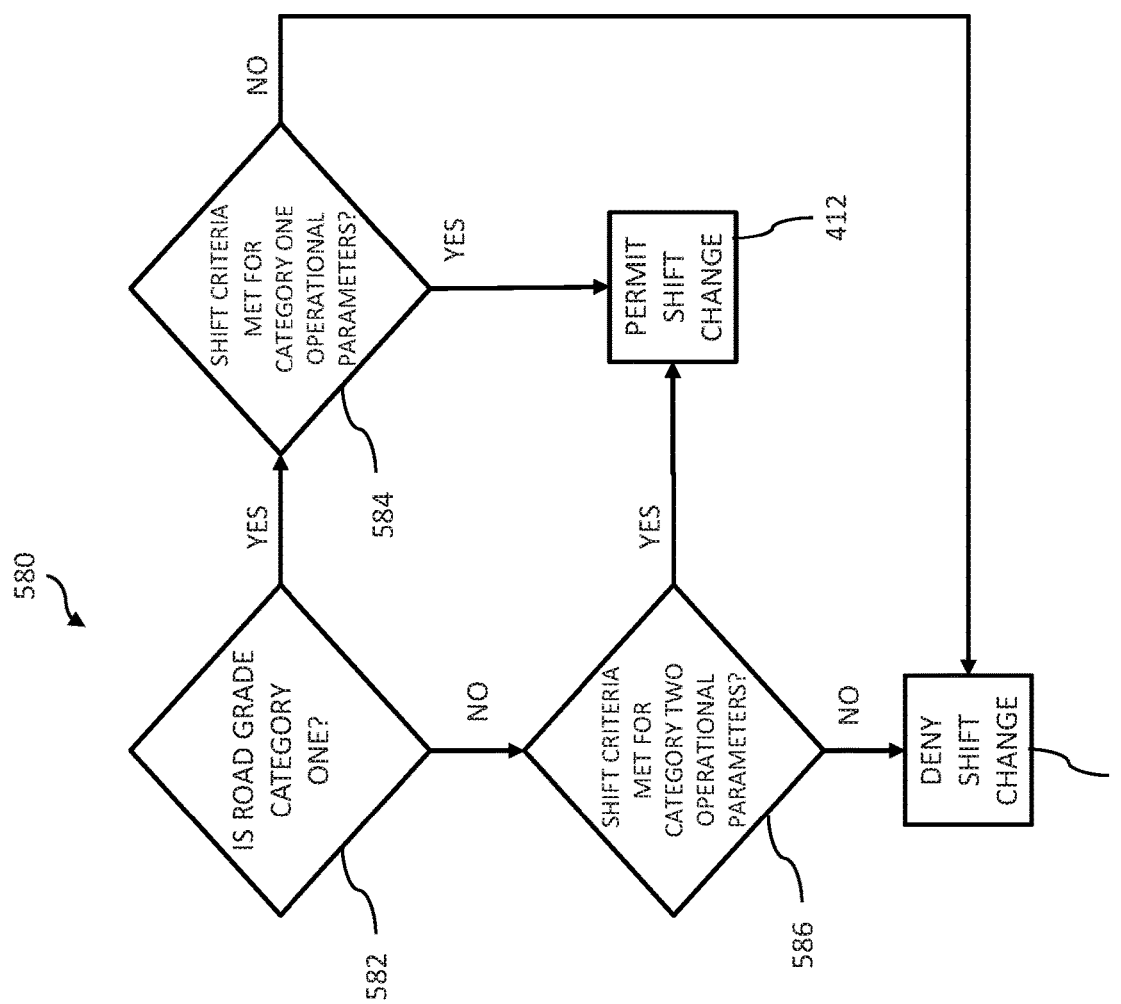
FIG. 10 illustrates a further exemplary processing sequence for a shift criteria logic of the transmission control circuit of the powered vehicular system of FIG. 1.

Referring to FIG. 10, in one embodiment, shift logic 400 uses different criteria in deciding whether to permit a shift change or deny a shift change based on one or more operational parameters. For example, different criteria may be provided for low grade versus steep grade; downhill grade versus uphill grade; light vehicle weight and heavy vehicle weight; and other categories.

In the illustrated embodiment, processing sequence 580 of shift logic 400 first determines a category of the road grade of vehicular system 100, as represented by block 582. In one example, the road grade of vehicular system 100 is classified as a first category if the road grade is zero or positive (uphill) and as a second category if the road grade is negative (downhill). In another example, the road grade of vehicular system 100 is classified as a first category if an absolute value of the road grade equals or exceeds a threshold amount (steep grade) and as a second category if the absolute value of the road grade is less than a threshold amount (low grade).

If the measured road grade is classified as category one (such as uphill), processing sequence 580 determines whether a first shift criteria for category one operational parameters is met, as represented by block 584. If so, the requested shift change is permitted, as represented by block 412. If not, the requested shift change is denied, as represented by block 414. If the measured road grade is classified as category two (such as downhill), processing sequence 580 determines whether a second shift criteria for category two operational parameters is met, as represented by block 586. If so, the requested shift change is permitted, as represented by block 412. If not, the requested shift change is denied, as represented by block 414.

Referring to FIG. 11, another exemplary processing sequence 550 for shift criteria logic 400 of transmission control circuit 200 is shown. Shift criteria logic 400 determines whether the shift criteria requirements for one or more of operational characteristics 420 are met, as represented by block 552. In one example, the shift criteria requirements for one or more of operational characteristics 420 are the requirements of processing sequence 500. In another example, the shift criteria requirements for one or more of operational characteristics 420 may be any requirements for the herein disclosed operational characteristics 420. If the shift criteria requirements for the one or more of operational characteristics 420 are met, shift criteria logic 400 permits the requested shift change as represented by block 412. If not, shift criteria logic 400 determines if an object avoidance criteria is met, as represented by block 554. In one example, the object avoidance criteria is a determination whether an object is within an envelope (threshold distance) of vehicular system 100. If the object avoidance criteria is met, shift criteria logic 400 permits the requested shift change as represented by block 412. If not, shift criteria logic 400 denies the requested shift change, as represented by block 414.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system for managing shift changes of a transmission of a vehicle, the system comprising:
    a multi-speed automatic transmission including an input member and an output member operatively coupled to the input member, the multi-speed automatic transmission being configurable in a plurality of forward speed ratios between the input member and the output member;
    a location determiner which provides an indication of a current location of the vehicle;
    an operator interface including a transmission shift selector;
    a control circuit operatively coupled to the multi-speed automatic transmission, to the location determiner, and to the operator interface, the control circuit shifting the multi-speed automatic transmission from a first forward speed ratio to a second forward speed ratio based on both the indication of the current location of the vehicle and a request to shift the multi-speed automatic transmission to the second forward speed ratio from the transmission shift selector; and
    a plurality of operational characteristic monitors which monitor a plurality of operational characteristics related to the vehicle,
    wherein the control circuit in response to receiving from the operator interface the request to establish the second forward speed ratio of the plurality of forward speed ratios, the control circuit configures the multi-speed automatic transmission in the second forward speed ratio if the plurality of operational characteristics satisfy a shift criteria logic and the control circuit maintains the multi-speed automatic transmission in the first forward speed ratio if the plurality of operational characteristics fail the shift criteria logic, the location determiner being one of the plurality of operational characteristic monitors,
    wherein a first operational characteristic monitor of the plurality of operational characteristic monitors provides an indication of a first movement characteristic of the vehicle, the control circuit configures the multi-speed automatic transmission in the second forward speed ratio when the first movement characteristic has a first value and the control circuit maintains the multi-speed. automatic transmission in the first forward speed ratio when the first movement characteristic has a second value,
    wherein the first movement characteristic is a vehicle related speed characteristic and the first value is below a vehicle related speed threshold and the second value is above the vehicle related speed threshold, and
    wherein the first operational characteristic monitor is a vehicle speed sensor.

2. The system of claim 1, wherein a second operational characteristic monitor of the plurality of operational characteristic monitors provides an indication of a second movement characteristic of the vehicle, the control circuit configures the multi-speed automatic transmission in the second forward speed ratio when the second movement characteristics has a first value and the control circuit maintains the multi-speed automatic transmission in the first forward speed ratio when the second movement characteristic has a second value, wherein the second movement characteristic is an engine load characteristic and the first value is below an engine load threshold and the second value is above the engine load threshold.

3. The system of claim 1, wherein a second operational characteristic monitor of the plurality of operational characteristic monitors provides an indication of an operator interface input characteristic of the vehicle, the control circuit configures the multi-speed automatic transmission in the second forward speed ratio when the operator interface input characteristic has a first value and the control circuit maintains the multi-speed automatic transmission in the first forward speed ratio when the operator interface input characteristic has a second value.

4. The system of claim 3, wherein the operator interface input characteristic is one of a throttle operator interface input characteristic based on a throttle control input of the operator interface, a service brake operator interface input characteristic based on a service brake input of the operator interface, an engine braking operator interface input characteristic based on an engine braking input of the operator interface, and a cruise control operator interface input characteristic based on a cruise control input of the operator interface.

5. The system of claim 3, wherein a third operational characteristic monitor of the plurality of operational characteristic monitors provides an indication of a vehicle load characteristic of the vehicle, the control circuit configures the multi-speed automatic transmission in the second forward speed ratio when the vehicle load characteristic has a first value and the control circuit maintains the multi-speed automatic transmission in the first forward speed ratio when the vehicle load characteristic has a second value.

6. The system of claim 1, wherein the plurality of operational characteristic monitors provide an indication of a road grade characteristic, an indication of a vehicle related speed characteristic, an indication of an engine load characteristic, and an indication of a throttle control operator interface input characteristic, the shift criteria logic determines if the indication of the road grade characteristic is above a road grade threshold and, if so, the shift criteria logic is satisfied.

7. The system of claim 1, wherein the location determiner is a GPS receiver.

8. A system for managing shift changes of a transmission of a vehicle, the system comprising:
    a multi-speed automatic transmission including an input member and an output member operatively coupled to the input member, the Multi-speed automatic transmission being configurable in a plurality of forward speed ratios between the input member and the output member;
    a location determiner which provides an indication of a current location of the vehicle;

an operator interface including a transmission shift selector;

a control circuit operatively coupled to the multi-speed automatic transmission, to the location determiner, and to the operator interface, the control circuit shifting the multi-speed automatic transmission from a first forward speed ratio to a second forward speed ratio based on both the indication of the current location of the vehicle and a request to shift the multi-speed automatic transmission to the second forward speed ratio from the transmission shift selector; and a plurality of operational characteristic monitors which monitor a plurality of operational characteristics related to the vehicle, wherein the control circuit in response to receiving from the operator interface the request to establish the second forward speed ratio of the plurality of forward speed ratios, the control circuit configures the multi-speed automatic transmission in the second forward speed ratio if the plurality of operational characteristics satisfy a shift criteria logic and the control circuit maintains the multi-speed automatic transmission in the first forward speed ratio if the plurality of operational characteristics fail the shift criteria logic, the location determiner being one of the plurality of operational characteristic monitors, wherein a first operational characteristic monitor of the plurality of operational characteristic monitors provides an indication of a movement characteristic of the vehicle, the control circuit configures the multi-speed automatic transmission in the second forward speed ratio when the movement characteristic has a first value and the control circuit maintains the multi-speed automatic transmission in the first forward speed ratio when the movement characteristic has a second value, and wherein the movement characteristic is a road grade characteristic and the first value is above a road grade threshold and the second value is below the road grade threshold wherein the road grade characteristic is determined by correlating the indication of the current location of the vehicle to a map of known road grades.

9. A system for managing shift changes of a transmission of a vehicle, the system comprising:

a multi-speed automatic transmission including an input member and an output member operatively coupled to the input member, the multi-speed automatic transmission being configurable in a plurality of forward speed ratios between the input member and the output member;

a location determiner which provides an indication of a current location of the vehicle;

an operator interface including a transmission shift selector;

a control circuit operatively coupled to the multi-speed automatic transmission, to the location determiner, and to the operator interface, the control circuit shilling the multi-speed automatic transmission from a first forward speed ratio to a second forward speed ratio based on both the indication of the current location of the vehicle and a request to shift the multi-speed automatic transmission to the second forward speed ratio from the transmission shift selector; and a plurality of operational characteristic monitors which monitor a plurality of operational characteristics related to the vehicle, wherein the control circuit in response to receiving from the operator interface the request to establish the second forward speed ratio of the plurality of forward speed ratios, the control circuit configures the multi-speed automatic transmission in the second forward speed ratio if the plurality of operational characteristics satisfy a shift criteria logic and the control circuit maintains the multi-speed automatic transmission in the first forward speed ratio if the plurality of operational characteristics fail the shift criteria logic, the location determiner being one of the plurality of operational characteristic monitors, wherein the plurality of operational characteristic monitors provide an indication of a road grade characteristic, an indication of a vehicle related speed characteristic, an indication of an engine load characteristic, an indication of a throttle control operator interface input characteristic, and an indication of a service brake operator interface input characteristic, the control circuit configures the multi-speed automatic transmission in the second forward speed ratio when the indication of a road grade characteristic, the indication of a vehicle related speed characteristic, the indication of an engine load characteristic, the indication of a throttle control operator interface input characteristic, and the indication of a service brake operator interface input characteristic have a first set of values that satisfy the shift criteria logic and the control circuit maintains multi-speed automatic transmission in the first forward speed ratio when the indication of a road grade characteristic, the indication of a vehicle related speed characteristic, the indication of an engine load characteristic, the indication of a throttle control input state characteristic, and the indication of a service brake input state characteristic have a second set of values that fail the shift criteria logic.

10. A system for managing shift changes of a transmission of a vehicle, the system comprising:

a multi-speed automatic transmission including an input member and an output member operatively coupled to the input member, the multi-speed automatic transmission being configurable in a plurality of forward speed ratios between the input member and the output member;

a location determiner which provides an indication of a current location of the vehicle;

an operator interface including a transmission shift selector;

a control circuit operatively coupled to the multi-speed automatic transmission, to the location determiner, and to the operator interface, the control circuit shifting the multi-speed automatic transmission from a first forward speed ratio to a second forward speed ratio based on both the indication of the current location of the vehicle and a request to shift the multi-speed automatic transmission to the second forward speed ratio front the transmission shift selector; and a plurality of operational characteristic monitors which monitor a plurality of operational characteristics related to the vehicle and provide an indication of a road grade characteristic, an indication of a vehicle related speed characteristic, an indication of an engine load characteristic, and an indication of a throttle control operator interface input characteristic, wherein the control circuit in response to receiving from the operator interface the request to establish the second forward speed ratio of the plurality of forward speed ratios, the control circuit configures the multi-speed automatic transmission in the second forward speed ratio if the plurality of operational characteristics satisfy a shift criteria logic and the control circuit maintains the multi-speed automatic transmission in the first forward speed ratio if the plurality of operational characteristics fail the shift criteria logic. the location determiner being one of the plurality of operational characteristic monitors, wherein the shift criteria logic determines if the indication of the road grade characteristic is above a road grade threshold and, if so, the shift criteria logic is satisfied, wherein if the indication of the road grade characteristic is below the road grade threshold, the shift criteria logic determines if the indication of the vehicle related speed characteristic is below a vehicle related speed threshold, and, if so, the shift criteria logic is satisfied.

11. The system of claim 10, wherein if the indication of the vehicle related speed characteristic is above the vehicle related speed threshold, the shift criteria logic determines if the indication of the throttle control operator interface input characteristic is above a throttle threshold and, if so, the shift criteria logic is failed.

12. The system of claim 11, wherein if the throttle control operator interface input characteristic is below the throttle threshold the shift criteria logic determines if the indication of the engine load characteristic is above an engine load threshold, and, if so, the shift criteria logic is failed.

13. A method for managing shift changes of a multi-speed automatic transmission of a vehicle, the method comprising the steps of:

receiving a request from a transmission shift selector of an operator interface located in an operator space of the vehicle to shift the multi-speed automatic transmission from a first forward speed ratio to a second forward speed ratio;

monitoring a plurality of operational characteristics related to the vehicle, the plurality of operational characteristics including a current location of the vehicle and a first operational characteristic which provides an indication of a first movement characteristic of the vehicle; and in response to receiving the request, determining whether to shift the multi-speed automatic transmission to the second forward speed ratio based in part on the current location of the vehicle and the request to shift the multi-speed automatic transmission to the second forward speed ratio, wherein the multi-speed automatic transmission is shifted to the second forward speed ratio if the plurality of operational characteristics satisfy a shift criteria logic and is maintained in the first forward speed ratio when the plurality of operational characteristics fail the shift criteria logic;

wherein the multi-speed automatic transmission is shifted to the second forward speed ratio when the first movement characteristic has a first value and is maintained in the first forward speed ratio when the movement characteristic has a second value, wherein the movement characteristic is a vehicle related speed characteristic and the first value is below a vehicle related speed threshold and the second value is above the vehicle related speed threshold, and wherein the first operational characteristic monitor is a vehicle speed sensor.

14. The method of claim 13, further comprising the step of determining a road grade characteristic based on the current location of the vehicle.

* * * * *

UNITED STATES PATENT AND TRADEMARK OFFICE
CERTIFICATE OF CORRECTION

PATENT NO. : 10,619,727 B2  
APPLICATION NO. : 15/816787  
DATED : April 14, 2020  
INVENTOR(S) : Brent Maurer et al.

Page 1 of 1

It is certified that error appears in the above-identified patent and that said Letters Patent is hereby corrected as shown below:

In the Claims

In Column 23, Line 56, please amend the word "shilling" to read "shifting".

In Column 24, Line 54, please amend "front the" to read "from the".

Signed and Sealed this  
Fourteenth Day of July, 2020

Andrei Iancu  
*Director of the United States Patent and Trademark Office*